United States Patent
Ando

(10) Patent No.: US 11,036,965 B2
(45) Date of Patent: Jun. 15, 2021

(54) SHAPE ESTIMATING APPARATUS

(71) Applicant: OMRON Corporation, Kyoto (JP)

(72) Inventor: Tanichi Ando, Komaki (JP)

(73) Assignee: OMRON Corporation, Kyoto (JP)

( * ) Notice: Subject to any disclaimer, the term of this patent is extended or adjusted under 35 U.S.C. 154(b) by 54 days.

(21) Appl. No.: 16/479,246

(22) PCT Filed: Jan. 25, 2018

(86) PCT No.: PCT/JP2018/003499
§ 371 (c)(1),
(2) Date: Jul. 19, 2019

(87) PCT Pub. No.: WO2018/150901
PCT Pub. Date: Aug. 23, 2018

(65) Prior Publication Data
US 2019/0384964 A1    Dec. 19, 2019

(30) Foreign Application Priority Data

Feb. 20, 2017   (JP) .............................. JP2017-029248

(51) Int. Cl.
| G06K 9/00 | (2006.01) |
| G01B 11/24 | (2006.01) |
| G06T 17/00 | (2006.01) |

(52) U.S. Cl.
CPC .......... *G06K 9/00208* (2013.01); *G01B 11/24* (2013.01); *G06T 17/00* (2013.01)

(58) Field of Classification Search
CPC . G06T 17/00; G06T 2207/20084; G06T 7/50; G06T 2207/20081; G06T 19/00;

(Continued)

(56) References Cited

U.S. PATENT DOCUMENTS

| 4,791,581 A | 12/1988 | Ohba |
| 4,885,702 A | 12/1989 | Ohba |

(Continued)

FOREIGN PATENT DOCUMENTS

| CN | 101657839 A | 2/2010 |
| CN | 102223553 A | 10/2011 |

(Continued)

OTHER PUBLICATIONS

Alec Radford et al., "Unsupervised Representation Learning with Deep Convolutional Generative Adversarial Networks", Under review as a conference paper at ICLR 2016, Jan. 7, 2016, URL: https://arxiv.org/abs/1511.06434, Concise explanation of relevance provided in the specification.

(Continued)

*Primary Examiner* — Kenny A Cese
(74) *Attorney, Agent, or Firm* — Metroplex IP Law Group, PLLC

(57) ABSTRACT

A shape estimating apparatus includes an acquiring unit and an estimating unit. The acquiring unit is configured to acquire a two-dimensional image. The estimating unit has artificial intelligence, and is configured to provide the artificial intelligence with the two-dimensional image and cause the artificial intelligence to estimate a three-dimensional shape of a subject of the two-dimensional image. A learning result of machine learning performed using learning data containing supervisor data expressing a three-dimensional shape of a sample subject and a sample two-dimensional image obtained by capturing an image of the three-dimensional shape of the sample subject is set to the artificial intelligence.

15 Claims, 11 Drawing Sheets

(58) Field of Classification Search
CPC ..... G06T 19/20; G06T 2200/04; G06T 7/344; G06T 7/75; G06K 9/00201; G06K 9/00208; G01B 11/24
See application file for complete search history.

(56) References Cited

U.S. PATENT DOCUMENTS

| | | | |
|---|---|---|---|
| 4,949,286 | A | 8/1990 | Ohba |
| 2006/0067573 | A1* | 3/2006 | Parr .................. G06K 9/00 382/154 |
| 2011/0043540 | A1 | 2/2011 | Fancher et al. |
| 2014/0198962 | A1 | 7/2014 | Anabuki et al. |
| 2014/0212030 | A1 | 7/2014 | Tytgat et al. |
| 2014/0212031 | A1 | 7/2014 | Tytgat et al. |
| 2015/0125049 | A1 | 5/2015 | Taigman et al. |
| 2016/0070952 | A1* | 3/2016 | Kim .................. G06K 9/00208 382/118 |
| 2016/0096318 | A1* | 4/2016 | Bickel ............... B33Y 10/00 264/40.1 |
| 2016/0371542 | A1* | 12/2016 | Sugita ............... G06F 3/00 |
| 2016/0379041 | A1 | 12/2016 | Rhee et al. |
| 2018/0218503 | A1* | 8/2018 | Xu .................... G06N 3/04 |
| 2019/0171868 | A1 | 6/2019 | Taigman et al. |
| 2019/0220659 | A1 | 7/2019 | Anabuki et al. |
| 2020/0285837 | A1 | 9/2020 | Rhee et al. |

FOREIGN PATENT DOCUMENTS

| | | |
|---|---|---|
| CN | 102645173 A | 8/2012 |
| CN | 102819855 A | 12/2012 |
| CN | 103608847 A | 2/2014 |
| CN | 103984936 A | 8/2014 |
| CN | 105488785 A | 4/2016 |
| CN | 105528779 A | 4/2016 |
| CN | 105874474 A | 8/2016 |
| CN | 105930382 A | 9/2016 |
| CN | 105979244 A | 9/2016 |
| CN | 106295496 A | 1/2017 |
| EP | 2869239 A2 | 5/2015 |
| JP | H06-162173 A | 6/1994 |
| JP | H7-49962 A | 2/1995 |
| JP | 2010-210576 A | 9/2010 |
| JP | 2014-137725 A | 7/2014 |
| JP | 2015-197374 A | 11/2015 |
| JP | 2016-194892 A | 11/2016 |

OTHER PUBLICATIONS

Shuiwang Ji et al, "3D Convolutional Neural Networks for Human Action Recognition", IEEE Transactions on Pattern Analysis and Machine Intelligence, Jan. 1, 2013, pp. 221-231, vol. 35, No. 1, IEEE Computer Society, USA, Relevance is indicated in the ISR/WO mailed on May 14, 2018.

The International Search Report("ISR") of PCT/JP2018/003499 dated May 14, 2018.

The Written Opinion("WO") of PCT/JP2018/003499 dated May 14, 2018.

Elad Richardson et al, "3D Face Reconstruction by Learning from Synthetic Data", Sep. 26, 2016, Department of Computer Science, Technion—Israel Institute of Technology; Relevance is indicated in the EPOA issued on Oct. 2, 2020.

The European Office Action (EPOA) dated Oct. 2, 2020 in a counterpart European patent application.

The Japanese Office Action (JPOA) dated Apr. 7, 2020 in a counterpart Japanese patent application.

The Chinese Office Action (CNOA) dated Sep. 2, 2020 in a counterpart Chinese patent application.

* cited by examiner

SHAPE ESTIMATING APPARATUS

CROSS-REFERENCES TO RELATED APPLICATIONS

This application claims priority to Japanese Patent Application No. 2017-029248 filed Feb. 20, 2017, the entire contents of which are incorporated herein by reference.

FIELD

The present invention relates to a technique for estimating a three-dimensional shape of a subject from a two-dimensional image.

BACKGROUND

Techniques for recognizing predetermined types of subjects by analyzing images captured using cameras are researched. For example, there are known techniques for recognizing predetermined types of subjects such as roadsides, traffic lanes, preceding vehicles, oncoming vehicles, pedestrians on a road, and the like, by analyzing images ahead of an automobile captured using a camera mounted in the automobile.

If such recognizing techniques are used in combination with a range apparatus such as a laser radar, information indicating, for example, that there is a preceding vehicle 10 meters ahead of the automobile can be obtained. Such information may be useful, for example, in the field of autonomous driving.

However, according to the above-described techniques for recognizing predetermined types of subjects, although information indicating, for example, that there is a preceding vehicle ahead of the automobile can be obtained, information on a three-dimensional shape of the preceding vehicle cannot be obtained.

If a three-dimensional shape of the preceding subject is not known, a proper corresponding operation may not be performed merely by detecting the presence of the subject. For example, if there is luggage sticking out of the carrier of an oncoming vehicle, proper corresponding operation may not be performed merely with information indicating that there is an oncoming vehicle.

"Unsupervised Representation Learning with Deep Convolutional Generative Adversarial Networks" <URL: https://arxiv.org/abs/1511.06434> is an example of background art.

SUMMARY

It is an object of the present invention to estimate a three-dimensional shape of a subject from a two-dimensional image.

In the following description and claims, "artificial intelligence" refers to a machine learning apparatus for attaining a predetermined ability through learning by the machine itself using a mechanism of machine learning such as deep learning, a learning method that is performed by the machine, an apparatus having an ability attained through learning, a method for realizing the same, or the like. In this application, the machine learning is not limited to deep learning, and may be any learning methods as long as an ability to estimate a shape can be attained.

A first aspect of the present invention is directed to a shape estimating apparatus including an acquiring unit and an estimating unit. The acquiring unit is configured to acquire a two-dimensional image. The estimating unit includes artificial intelligence, and is configured to provide the artificial intelligence with the two-dimensional image and cause the artificial intelligence to estimate a three-dimensional shape of a subject of the two-dimensional image. A learning result of machine learning performed using learning data containing supervisor data expressing a three-dimensional shape of a sample subject and a sample two-dimensional image obtained by capturing an image of the three-dimensional shape of the sample subject is set to the artificial intelligence.

A twelfth aspect of the present invention is directed to a shape estimating method. The method includes acquiring a two-dimensional image, providing an artificial intelligence with the two-dimensional image, and using the artificial intelligence to estimate a three-dimensional shape of a subject of the two-dimensional image. A learning result of machine learning performed using learning data containing supervisor data expressing a three-dimensional shape of a sample subject and a sample two-dimensional image obtained by capturing an image of the three-dimensional shape of the sample subject is set to the artificial intelligence.

Thus, according to these aspects, it is possible to estimate a three-dimensional shape of a subject from a two-dimensional image.

According to a second aspect, the estimating unit uses the artificial intelligence to estimate a three-dimensional shape of the subject of the two-dimensional image, thereby obtaining shape information describing the three-dimensional shape. Thus, according to this aspect, it is possible to obtain shape information describing a three-dimensional shape of a subject, from a two-dimensional image.

According to a third aspect, the shape information contains, for each deformation that is to be applied to a surface of a predetermined three-dimensional shape expressed by a basic model, positional information and intensity information respectively defining a position and an intensity of the deformation. Thus, according to this aspect, the shape information can express at least a basic three-dimensional shape of a subject (without taking an actual size into consideration) in a smaller data size, for example, compared with a case in which polygons are used.

According to a fourth aspect, the shape information further contains size information defining an actual size of the three-dimensional shape of the subject of the two-dimensional image. Thus, according to this aspect, the shape information can express a three-dimensional shape including an actual size of a subject in a smaller data size, for example, compared with a case in which polygons are used.

According to a fifth aspect, the deformation includes a first type of deformation for displacing a point of action indicated by the positional information on the surface of the predetermined three-dimensional shape, by an amount indicated by the intensity information, along a direction of action that is substantially parallel to a straight line extending from a predetermined origin to the point of action. Thus, according to this aspect, it is possible to express, in a small data size, protrusions and recesses included in a basic three-dimensional shape of a subject.

According to a sixth aspect the first type of deformation is expansion or contraction that appears on the surface of the predetermined three-dimensional shape when the point of action is displaced along the direction of action by the amount indicated by the intensity information on an assumption that the surface of the predetermined three-dimensional shape is made of an expandable and contractible film. Thus, according to this aspect, the shape information can express, in a small data size, protrusions and recesses included in a basic three-dimensional shape of a subject.

According to a seventh aspect the first type of deformation is expansion or contraction that appears on the surface of the predetermined three-dimensional shape when the point of action is displaced along the direction of action by the amount indicated by the intensity information, by pressing a curved face against the point of action from the inside or outside of the film on an assumption that the surface of the predetermined three-dimensional shape is made of an expandable and contractible film. Thus, according to this aspect, the shape information can express, in a small data size, rounded protrusions and recesses included in a basic three-dimensional shape of a subject.

According to an eighth aspect, the shape information further contains size information defining a size of the curved face. Thus, according to this aspect, the shape information can express, in a small data size, a more complex three-dimensional shape.

According to a ninth aspect, the machine learning includes: providing artificial intelligence for learning with the sample two-dimensional image and using the artificial intelligence for learning to estimate a three-dimensional shape of the sample subject; generating a reproduced image obtained by capturing an image of an estimated three-dimensional shape of the sample subject rendered based on an estimation result of the three-dimensional shape of the sample subject; and updating a learning parameter of the artificial intelligence for learning such that the reproduced image becomes similar to the sample two-dimensional image. Thus, according to this aspect, it is possible to cause artificial intelligence for learning to attain an ability to estimate a three-dimensional shape of a subject from a two-dimensional image.

According to a tenth aspect, the estimating unit estimates an orientation of the subject, and further generates orientation information indicating a difference from a reference orientation of the subject. Thus, according to this aspect, it is possible to estimate not only a three-dimensional shape of a subject but also an orientation thereof from a two-dimensional image.

According to an eleventh aspect, the three-dimensional shape of the subject is substantially plane symmetric about a reference plane, and the shape information contains the positional information and the intensity information regarding deformation that is to be applied to one side of the reference plane on the surface of the predetermined three-dimensional shape, and does not contain the positional information and the intensity information regarding deformation that is to be applied to another side of the reference plane on the surface of the predetermined three-dimensional shape. Thus, according to this aspect, it is possible to reduce the data size because the shape information does not have to contain positional information and intensity information regarding about a half of all the deformation.

According to the present invention, it is possible to estimate a three-dimensional shape of a subject from a two-dimensional image.

DETAILED DESCRIPTION

Figure 1:
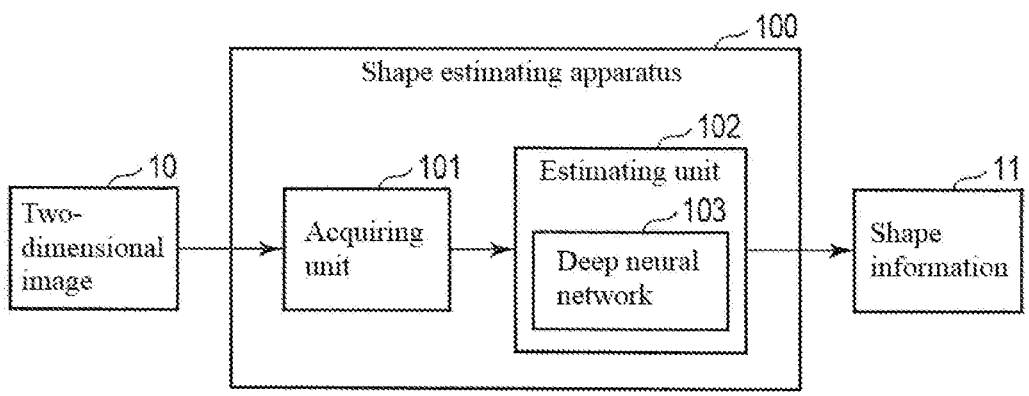
FIG. 1 is a block diagram showing an example of a shape estimating apparatus according to a first embodiment.

Hereinafter, embodiments of the present invention will be described with reference to the drawings. Note that constituent elements that are the same as or similar to those already described are denoted by the same or similar reference numerals, and, basically, a description thereof may not be repeated.

First Embodiment

As shown in FIG. 1, a shape estimating apparatus 100 according to a first embodiment includes an acquiring unit 101 and an estimating unit 102. The shape estimating apparatus 100 receives a two-dimensional image 10, and estimates a three-dimensional shape of a subject of the two-dimensional image 10, from the two-dimensional image 10. The estimation result may be output, for example, as shape information 11, which will be described later.

The shape estimating apparatus 100 may have a learning function for attaining an ability to estimate a shape, or may acquire a result of machine learning for attaining an ability to estimate a shape from a learning apparatus that is an external apparatus.

The acquiring unit 101 acquires a two-dimensional image 10. For example, the acquiring unit 101 may acquire, as a two-dimensional image 10, frame data of a moving image that is being captured in real-time using an unshown camera, or may acquire a two-dimensional image 10 that was previously captured and stored in an unshown storage. The acquiring unit 101 may output the two-dimensional image 10 as it is to the estimating unit 102, or may recognize one or more subject regions contained in the two-dimensional image 10, and extract the subject regions and output them to the estimating unit 102.

The estimating unit 102 receives the two-dimensional image 10 from the acquiring unit 101, and provides a deep neural network 103 with the two-dimensional image 10, thereby causing the deep neural network 103 to estimate a three-dimensional shape of a subject of the two-dimensional image 10. A learning result of machine learning (supervised learning) performed using learning data containing supervisor data expressing a three-dimensional shape of a sample subject and a sample two-dimensional image obtained by capturing an image of the three-dimensional shape of the sample subject is set to the deep neural network 103. The deep neural network 103 may be replaced with artificial intelligence (an apparatus having an ability to estimate a shape, attained through machine learning) other than a deep neural network. The estimating unit 102 may generate and output the shape information 11 as an estimation result.

A learning result (e.g., learning parameters such as biases of units in the neural network, or weights of edges between units) obtained through machine learning (e.g., deep learning) for attaining an ability to estimate a three-dimensional shape of a subject of the two-dimensional image 10, from the two-dimensional image 10 is set to the deep neural network 103. The machine learning can be performed, for example, as follows.

Figure 2:
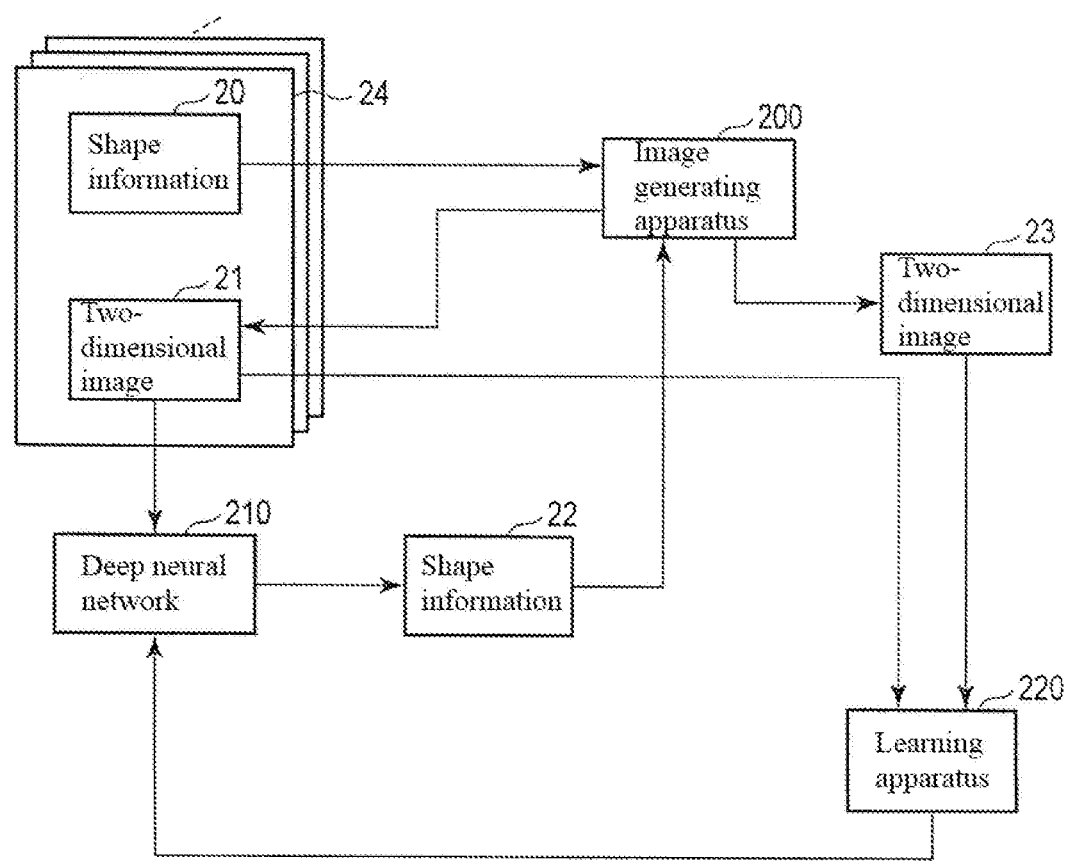
FIG. 2 is a block diagram showing an example of a machine learning system for obtaining a learning parameter that is to be set to a deep neural network in FIG. 1.

FIG. 2 shows an example of a machine learning system for training a deep neural network 210 through machine learning. Each piece of learning data 24 used in the machine learning contains a two-dimensional image 21 of a sample subject as input data, and shape information 20 of the sample subject as supervisor data. The two-dimensional image 21 may be generated, for example, by causing an image generating apparatus 200 to render a three-dimensional shape of the sample subject based on the shape information 20, and capturing an image of the three-dimensional shape using a virtual camera. Note that a large number of two-dimensional images 21 with different orientations or positions of the subject can be generated from one set of shape information 20, by changing the arrangement of the virtual camera.

The image generating apparatus 200 renders a three-dimensional shape of a sample subject based on the shape information 20. The image generating apparatus 200 may include, for example, a program for generating three-dimensional CG based on the shape information 20, and a processor for executing the program. This program can be based on, for example, a technique for generating three-dimensional CG used in video products such as movies, TV programs, and video games. For example, the function of the image generating apparatus 200 can be realized by combining an existing program for generating three-dimensional CG from a predetermined parameter and a program for converting shape information into the predetermined parameter. Similar image generation may be performed by capturing images of a target from various positions and directions, using an actual subject and a robot for manipulating a camera. It is possible to efficiently generate a large number of images, by designating image capturing conditions for the robot.

The deep neural network 210 acquires the two-dimensional image 21 as input data, and estimates a three-dimensional shape of a subject of the two-dimensional image 21. The deep neural network 210 generates shape information 22 as an estimation result.

A learning apparatus 220 trains the deep neural network 210 (update learning parameters) such that the shape information 22 approaches the shape information 20 as supervisor data.

Specifically, the learning apparatus 220 may train the deep neural network 210 so as to minimize a difference between the shape information 20 and the shape information 22, or may train the deep neural network 210 so as to minimize a difference between a two-dimensional image 23 (also referred to as a "reproduced image") obtained by converting the shape information 22 into a two-dimensional image, and the two-dimensional image 21. The shape information 22 can be converted into a two-dimensional image, for example, by causing the image generating apparatus 200 to render a three-dimensional shape based on the shape information 22, and capturing an image of the three-dimensional shape using a virtual camera.

For the learning for minimizing a difference between the two-dimensional image 23 and the two-dimensional image 21, for example, an algorithm similar to DCGAN (deep convolutional generative adversarial networks) may be used. DCGAN makes it possible to attain an ability to generate an image that looks real (e.g., that cannot be distinguished from the image used in the learning), by performing learning using a large number of images. In GAN that provides a base for DCGAN, Generator and Discriminator alternately repeat learning (a so-called cat-and-mouse game). As a result, Generator attains an ability to generate data that Discriminator mistakes for the data used in the learning.

The neural network learning method in the present invention is not limited to DCGAN. The learning may be any learning as long as a difference between an output obtained by inputting predetermined two-dimensional shape data into a neural network and a three-dimensional shape corresponding thereto can be calculated. The learning can be advanced by performing the learning so as to reduce the difference. Specifically, the learning may be performed so as to reduce a difference between shape information that is an output from the neural network and supervisor data of the shape information. Alternatively, the learning may be performed so as to reduce a difference between converted shape information obtained by converting shape information that is an output from the neural network into another vector using a predetermined function, and supervisor data of the converted shape information. At that time, the number of dimensions of the vector may be increased or decreased.

The shape information 11 (and the shape information 20 and the shape information 22) may be any information that can express a three-dimensional shape of a subject. The three-dimensional shape of a subject can be expressed, for example, as CAD data using polygons, for designing an outer shape of a product as a subject. In this case, a result of learning to, when a predetermined two-dimensional image is input, estimate and output CAD data using polygons corresponding thereto is set to the shape estimating apparatus 100. In the case of a simple subject with a small number of polygons, the learning is completed in a relatively short period of time. If each neuron for output of the neural network can output each portion of parameters constituting the polygons, an ability to estimate a shape of the polygons can be attained by training the neural network.

Meanwhile, if a relatively complex three-dimensional shape is expressed, for example, by several hundreds of polygons, the data size of the shape information 11 becomes extremely large. Thus, the machine learning using the shape information 11 requires a vast amount of calculation, and thus it may be difficult to realize such machine learning in view of cost and required time. Thus, in order to reduce the data size, it is possible to use shape information 11 as described below. It is also possible to use shape information 11 other than that described below, as long as it is data that can describe a three-dimensional shape with a predetermined number of sets of numeric value data. It is possible to use any shape information 11 constituted by parameters that can be associated with output of the neural network.

Specifically, the shape information 11 can be defined, for example, as a vector containing values of information such as positional information and intensity information, which will be described later, for expressing a basic three-dimensional shape of a subject. The vector as the shape information 11 may further contain a value of size information, which will be described later. This shape information 11 can express a three-dimensional shape in an extremely smaller data size, for example, compared with polygons used to generate three-dimensional CG (computer graphics) in conventional video games or movies. Thus, it is possible to reduce the amount of calculation necessary for machine learning, which will be described later, by using this shape information 11.

Specifically, the estimating unit 102 expresses an estimated basic three-dimensional shape of a subject, by applying given deformation to a surface of a predetermined three-dimensional shape expressed by a basic model. Note that "basic" refers to not identifying an actual size. That is to say, a basic three-dimensional shape may be any shape as long as it is substantially similar to a real three-dimensional shape of the subject, and its size does not have to be the actual size. For example, a basic three-dimensional shape of an automobile may be the same as a basic three-dimensional shape of a toy car. Furthermore, for example, the predetermined three-dimensional shape may be a sphere, a cube, or the like, but there is no limitation to this.

The shape information 11 may contain, for each given deformation that is to be applied to the surface of the predetermined three-dimensional shape, positional information and intensity information respectively defining the position and the intensity of the deformation.

The given deformation may include, for example, a first type of deformation for displacing a point of action indicated by the positional information on the surface of the predetermined three-dimensional shape, by an amount indicated by the intensity information, along a direction of action that is substantially parallel to a straight line extending from a predetermined origin to the point of action. The first type of deformation conceptually corresponds to pulling one point (point of action) on the surface of the predetermined three-dimensional shape toward the outside of the three-dimensional shape, or pushing the point toward the inside of the three-dimensional shape. The origin is defined, for example, at the center point of the predetermined three-dimensional shape, but there is no limitation to this.

Through the first type of deformation, the portion around the point of action on the surface of the predetermined three-dimensional shape is also displaced following the point of action, and the shape of the portion around the point of action is also changed. For example, the first type of deformation may be (or be expressed by a model that simulates) expansion or contraction that appears on the surface of the three-dimensional shape when the point of action is displaced along the direction of action by the amount indicated by the intensity information on an assumption that the surface of the predetermined three-dimensional shape is made of an expandable and contractible film (e.g., rubber).

If the three-dimensional shape is expressed in this manner, when data of part of the three-dimensional shape is slightly changed, the surrounding portion that is affected thereby also slightly changes while maintaining the continuity of the surface. This change is preferable for learning performed by reducing differences in a deep neural network. In such an expression method, it is not necessary to re-calculate the positions of polygons adjacent to a polygon deformed during learning as in the case of combining polygons, and thus the calculation processing can be simpler, and the calculation amount can be reduced. As a result, the learning efficiency is improved.

The first type of deformation may be performed, for example, using a curved face with a fixed or variable size. The size in this case does not have to be an actual size, and may be, for example, a size in any unit where a reference size such as the length of a radius or one side of the predetermined three-dimensional shape is taken as "1". That is to say, the first type of deformation may be (or be expressed by a model that simulates) expansion or contraction that appears on the surface of the three-dimensional shape when the point of action is displaced along the direction of action by the amount indicated by the intensity information, by pressing a curved face against the point of action from the inside or outside of the film on an assumption that the surface of the predetermined three-dimensional shape is made of an expandable and contractible film.

If the size of the curved face (e.g., the radius of the spherical face) is variable, it is possible to express a more complex three-dimensional shape. In this case, the shape information 11 has to contain size information defining a size of the curved face, for each first type of deformation that is to be applied to the surface of the predetermined three-dimensional shape. The shape of the curved face is, for example, a spherical face, but there is no limitation to this, and the shape may be an angular shape, for example.

The estimating unit 102 may perform estimation assuming that the three-dimensional shape is substantially plane symmetric about a reference plane (e.g., left-right symmetric, up-down symmetric, or front-rear symmetric). Under such an assumption, information regarding a half of deformation that is to be applied to the surface of the predetermined three-dimensional shape can be omitted from the shape information 11.

Specifically, it is sufficient that the shape information 11 contains positional information and intensity information regarding only deformation that is to be applied to one side (e.g., the right side) of the reference plane on the surface of the predetermined three-dimensional shape. Deformation that is to be applied to the other side (e.g., the left side) can be obtained by copying and converting as appropriate the positional information regarding the deformation that is to be applied to the one side. If the data size of the shape information 11 is reduced, the amount of calculation necessary for machine learning can be further reduced. Also under such an assumption, for example, it is possible to express an asymmetric three-dimensional shape by adding information expressing deformation that acts only on one or the other side of the reference plane, to the shape information 11.

The shape information 11 may further contain size information defining an actual size of a three-dimensional shape of a subject. For example, if the size information has the value "s", (s is a positive actual value, for example), an estimation result of a three-dimensional shape including an actual size of a subject may be defined with a three-dimensional shape obtained when the above-described deformation is performed in the case where the predetermined three-dimensional shape is a sphere with a radius s [m].

As described above, the shape estimating apparatus according to the first embodiment provides artificial intelligence with a two-dimensional image, thereby causing the artificial intelligence to estimate a three-dimensional shape of a subject of the two-dimensional image. A learning result of machine learning performed using learning data containing supervisor data expressing a three-dimensional shape of a sample subject and a sample two-dimensional image obtained by capturing an image of the three-dimensional shape of the sample subject is set to the artificial intelligence. Thus, according to this shape estimating apparatus, it is possible to estimate a three-dimensional shape of a subject from a two-dimensional image.

Furthermore, for example, shape information may be generated as an estimation result. The shape information may be defined, for each given deformation that is to be applied to the surface of the predetermined three-dimensional shape, as a vector containing values of positional information and intensity information respectively defining the position and the intensity of the deformation. If such shape information is used, it is possible to express a three-dimensional shape of a subject of a two-dimensional image in a smaller data size, for example, compared with a case in which polygons are used. Furthermore, the vector as the shape information may further contain a value of size information defining an actual size of a three-dimensional shape of a subject. If such shape information is used, it is possible to express a three-dimensional shape including an actual size of a subject of a two-dimensional image in a smaller data size, for example, compared with a case in which polygons are used.

Note that the shape estimating apparatus according to the first embodiment may estimate, in addition to a three-dimensional shape of a subject of a two-dimensional image, an orientation of the subject. The orientation can be expressed, for example, by orientation information indicating a difference (rotational angle) from a reference orientation of the subject (e.g., a status in which the subject is oriented in the front). In order to realize such an additional function, for example, the above-described machine learning may be performed using, in addition to the shape information, orientation information as supervisor data.

The method for expressing a three-dimensional shape is not limited to those described above. For example, it is possible to express a three-dimensional shape, by stacking a predetermined number of cubes (e.g., 100 cubes), and using a relative position of each cube as a vector. A method that can express a three-dimensional dimensional shape using a predetermined number of parameters can be learned using given expression (shape information).

Second Embodiment

A second embodiment is directed to a spatial recognition system using the shape estimating apparatus according to the first embodiment. This spatial recognition system recognizes (models) a subject in a scene from a (two-dimensional) scene image captured using a camera. Specifically, the spatial recognition system generates a scene parameter expressing a subject in a scene from a scene image. The scene parameter contains the above-described shape information and orientation information.

Figure 3:
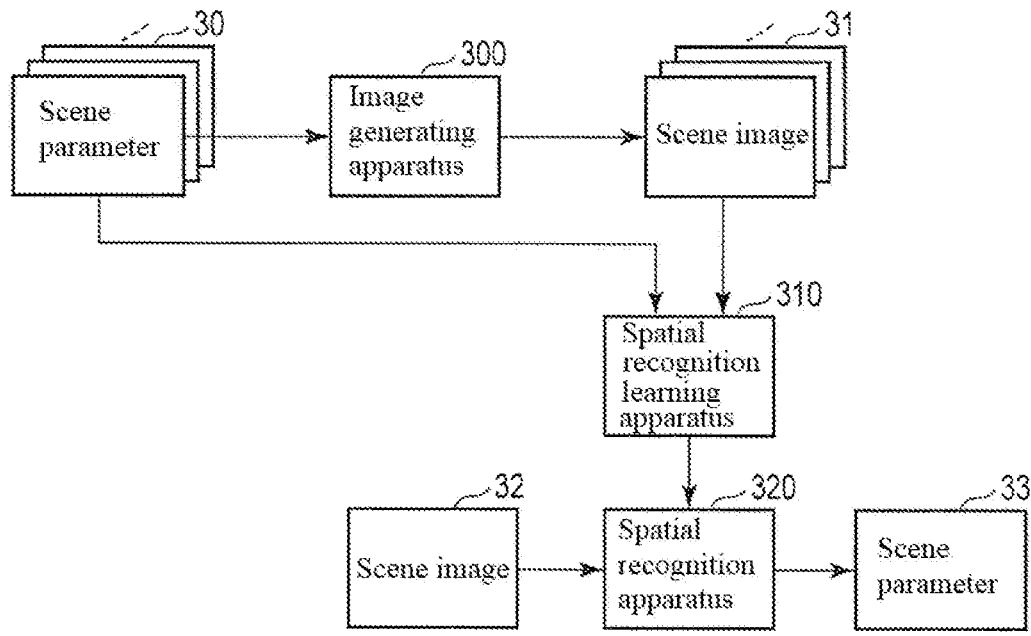
FIG. 3 is a block diagram showing an example of a spatial recognition system according to a second embodiment.

As shown in the example in FIG. 3, the spatial recognition system according to the second embodiment includes a spatial recognition apparatus 320. The spatial recognition apparatus 320 recognizes a subject in a scene from a scene image 32, and generates a scene parameter 33 expressing the subject.

Figure 4:
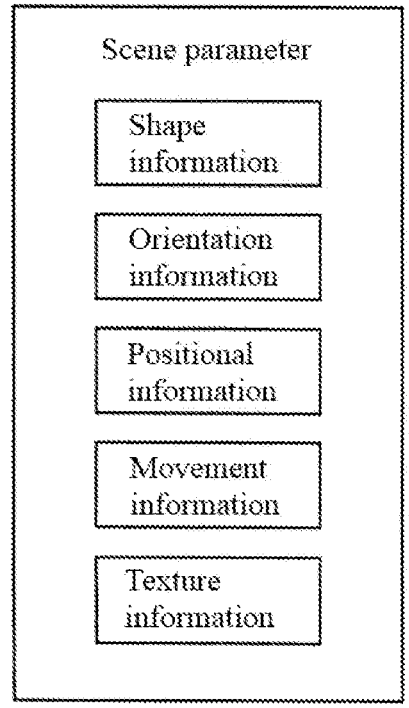
FIG. 4 is a diagram showing an example of a data configuration of a scene parameter in FIG. 3.

As shown in the example in FIG. 4, the scene parameter 33 contains shape information, orientation information, positional information, movement information, and texture information. The scene parameter 33 may further contain other information not shown in FIG. 4, or may not contain part of the information shown in FIG. 4. For example, the texture information may be excluded from the recognition target.

The shape information and the orientation information in FIG. 4 may be the same as or similar to the shape information and the orientation information described in the first embodiment. That is to say, the shape information may be defined as a vector containing values of information (e.g., positional information and intensity information) expressing an appropriate number of sets of deformation. The shape information may be defined as a vector further containing a value of size information. The orientation information may be defined so as to indicate a difference (rotational angle) from a reference orientation of the subject (e.g., a status in which the subject is oriented in the front).

The positional information indicates the position occupied by a subject, and is defined, for example, as coordinates in a nearby space, which will be described later. The positional information may be expressed using either a rectangular coordinate system or a polar coordinate system. The movement information indicates a movement status of a subject. Accordingly, the movement information is not necessary for the scene parameter of a subject that is not a moving member. The movement status is typically a direction, but may contain a velocity or an acceleration.

The texture information is defined as an image expressing a texture (e.g., color, pattern, text character) of a subject. Note that, also regarding a subject that is a three-dimensional figure, the texture thereof can be expressed as a two-dimensional image by generating a development drawing of the external appearance of the subject.

The spatial recognition apparatus 320 recognizes a subject in a scene from the scene image 32 using an unshown deep neural network, and generates the scene parameter 33. A learning parameter obtained, for example, through the following machine learning is set to the deep neural network.

The machine learning is performed using a spatial recognition learning apparatus 310 in FIG. 3. Learning data used in the machine learning contains a scene image 31 of a sample subject as input data and a scene parameter 30 of the sample subject as supervisor data.

The scene image 31 may be generated, for example, by causing an image generating apparatus 300 to render a three-dimensional shape of the sample subject based on the scene parameter 30, and capturing an image of the three-dimensional shape using a virtual camera.

Note that the arrangement of the virtual camera is determined based on the orientation information and the positional information contained in the scene parameter 30.

Thus, even in the case where pieces of shape information are the same, external appearances of a subject in the scene image 31 are different if pieces of orientation information or positional information are different.

The image generating apparatus 300 renders a three-dimensional shape of a sample subject based on the shape information contained in the scene parameter. The image generating apparatus 300 may be the same as or similar to the above-described image generating apparatus 200. As in the first embodiment, the virtual camera may be replaced with an actual camera that is manipulated by a robot or the like.

The deep neural network for learning included in the spatial recognition learning apparatus 310 acquires the scene image 31 as input data, and recognizes a subject of the scene image 31. The deep neural network generates a scene parameter as a recognition result.

The spatial recognition learning apparatus 310 trains the deep neural network such that the scene parameter generated by the deep neural network for learning approaches the scene parameter 30 as supervisor data.

Specifically, the spatial recognition learning apparatus 310 may train the deep neural network so as to minimize a difference between the scene parameter 30 and the scene parameter generated by the deep neural network for learning. Alternatively, the spatial recognition learning apparatus 310 may train the deep neural network so as to minimize a difference between a two-dimensional image (also referred to as a "reproduced image") obtained by converting the scene parameter generated by the deep neural network for learning into a two-dimensional image, and the scene image 31. The scene parameter can be converted into a two-dimensional image, for example, by causing the image generating apparatus 300 to render a three-dimensional shape based on the shape information contained in the scene parameter, and capturing an image of the three-dimensional shape using a virtual camera. For the learning for minimizing a difference between images, for example, an algorithm similar to DCGAN may be used.

The spatial recognition learning apparatus 310 transmits a learning result (e.g., learning parameters such as biases of units in a deep neural network after the end of learning, or weights of edges between units) to the spatial recognition apparatus 320 after the machine learning has been ended.

The spatial recognition apparatus 320 sets the learning parameter received from the spatial recognition learning apparatus 310 to its own deep neural network, thereby attaining an ability to recognize a subject in a scene from the scene image 32 and generate the scene parameter 33.

It is also possible to perform training by providing a relatively simple scene, and then perform training corresponding to complex scenes by gradually adding constituent elements. Accordingly, the learning efficiency is expected to be improved.

As described above, the spatial recognition apparatus according to the second embodiment recognizes a subject in a scene image, and generates a scene parameter containing shape information that is the same as or similar to that in the first embodiment, as a recognition result of the subject. Thus, if such a scene parameter is used, it is possible to cause the deep neural network to attain an ability to recognize at least a three-dimensional shape of a subject in a scene image in a small calculation amount, for example, compared with a case in which polygons are used as the shape information.

EXAMPLES

Hereinafter, forward looking processing of a vehicle according to an embodiment of the spatial recognition system will be described, but the examples of the spatial recognition system are not limited thereto.

Figure 6:
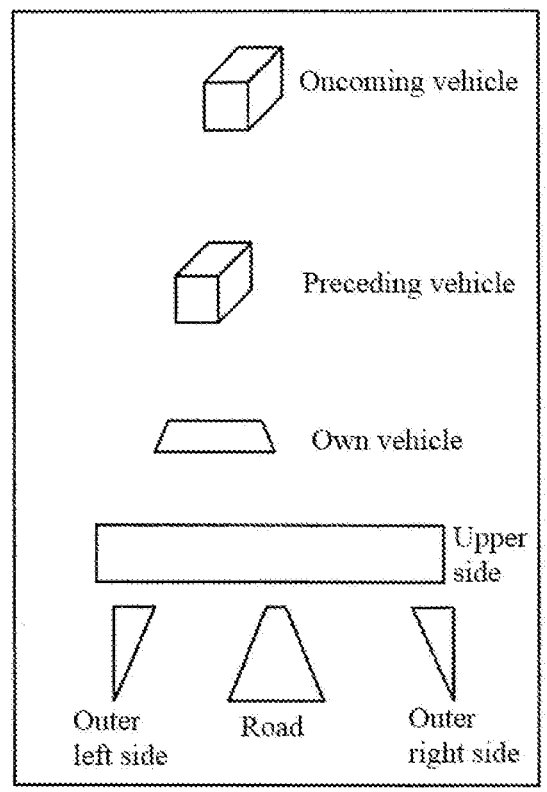
FIG. 6 is a diagram showing an example of subjects that may be contained in a scene image obtained by capturing an image ahead of a vehicle.

In forward looking processing of a vehicle, a vehicle-mounted camera captures an image ahead of the vehicle, and generates a scene image. This scene image contains various subjects. For example, as shown in FIG. 6, subjects such as a preceding vehicle, an oncoming vehicle, part (e.g., a hood) of own vehicle (image capturing vehicle), a road, a region on the left side of the road, a region on the right side of the road, a region (e.g., sky) above the road, and the like may be contained in the scene image. The spatial recognition apparatus 320 can individually model these subjects using a scene parameter shown as an example in FIG. 4.

Meanwhile, the image generating apparatus 300 can reproduce a desired scene image from a scene parameter of one or a plurality of subjects. For example, if the image generating apparatus 300 is provided with respective scene parameters of a road, a preceding vehicle, and an oncoming vehicle, the image generating apparatus 300 can reproduce a scene image in which the preceding vehicle and the oncoming vehicle are present on the road.

The scene parameter generated by the spatial recognition apparatus 320 is useful for inferring a situation around the vehicle, as described below.

Figure 5A:
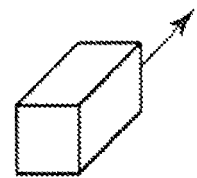
FIG. 5A is a diagram showing an example of an orientation of a preceding vehicle.
Figure 5B:
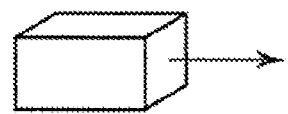
FIG. 5B is a diagram showing an example of an orientation of a preceding vehicle.

A preceding vehicle (bus) that is on a road curving to the right as viewed from the image capturing vehicle may appear in a scene image, for example, as shown in FIG. 5A. In FIGS. 5A to 5D, the arrows indicate the orientations of front faces of vehicle bodies. In this case, the spatial recognition apparatus 320 can recognize the orientation of the preceding vehicle from the scene image, and infer that the preceding vehicle is driving properly along the road direction. On the other hand, a preceding vehicle that is on the same road may appear in a scene image, for example, as shown in FIG. 5B. The spatial recognition apparatus 320 can recognize the orientation of the preceding vehicle from the scene image, and detect that the orientation of the preceding vehicle has deviated from the road direction. As a result, the spatial recognition apparatus 320 may infer that the preceding vehicle is spinning or has been stopped blocking up the road.

Figure 5C:
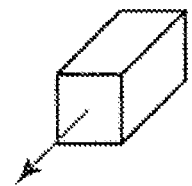
FIG. 5C is a diagram showing an example of an orientation of an oncoming vehicle.
Figure 5D:
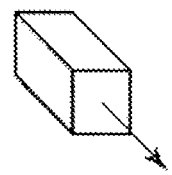
FIG. 5D is a diagram showing an example of an orientation of an oncoming vehicle.

An oncoming vehicle (bus) that is on a road curving to the right as viewed from the image capturing vehicle (curving to the left as viewed from the oncoming vehicle) may appear in a scene image, for example, as shown in FIG. 5C. In this case, the spatial recognition apparatus 320 can recognize the orientation of the oncoming vehicle from the scene image, and infer that the oncoming vehicle is driving properly along the road direction. On the other hand, an oncoming vehicle that is on the same road may appear in a scene image, for example, as shown in FIG. 5D. The spatial recognition apparatus 320 can recognize the orientation of the oncoming vehicle from the scene image, and detect that the orientation of the oncoming vehicle has deviated from the road direction. As a result, the spatial recognition apparatus 320 may infer that the oncoming vehicle may enter the traffic lane of the image capturing vehicle.

The inference of the situation of a preceding vehicle or an oncoming vehicle based on the orientation information described with reference to FIGS. 5A to 5D is effective in that the risk of a collision against a preceding vehicle or an oncoming vehicle can be found at an early stage. The risk of a collision can be evaluated to some extent from the position of a preceding vehicle or an oncoming vehicle or the distance from the image capturing vehicle, but, if the orientation information is used, an abnormal approach or the risk of a collision can be found before the vehicle moves close to a preceding vehicle or an oncoming vehicle, and necessary measure can be implemented. The orientation information can be used to estimate the traveling direction of a preceding vehicle or an oncoming vehicle even in the case where such inference is not performed.

For example, when driving or parking a vehicle in a parking area while avoiding obstacles such as other vehicles, a gate, or a fence, the shape information of each obstacle recognized by the spatial recognition apparatus 320 is useful. Furthermore, in a scene image, a subject may be blocked by the influence of the surroundings, but the influence can be inferred from the shape information of the subject recognized by the spatial recognition apparatus 320. For example, if the entire preceding vehicle is not seen (e.g., the accuracy of the shape information of the preceding vehicle is low), the spatial recognition apparatus 320 may infer that there is an obstacle or another vehicle between the image capturing vehicle and the preceding vehicle.

Figure 7:
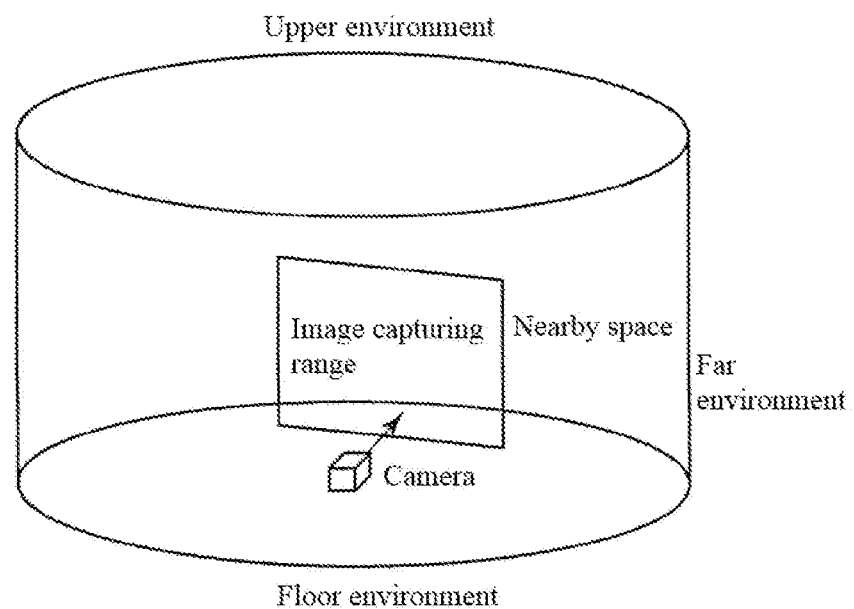
FIG. 7 is a diagram showing an example of an environmental model in an example.

An environmental model that is used by the spatial recognition apparatus 320 in this example is shown as an example in FIG. 7. In FIG. 7, a nearby space is defined as a column with a predetermined radius centered about a camera. The bottom face of the column is defined as a floor environment, and the upper face of the column is defined as an upper environment. The outside of the nearby space is defined as a far environment. The camera captures images in the nearby space and the far environment according to a set image capturing direction, thereby generating scene images. The image capturing range of the camera changes in accordance with the image capturing direction.

Each subject (e.g., a preceding vehicle, and an oncoming vehicle) may be defined as being at any position in the floor environment. In this case, the positional information of each subject can be expressed as two-dimensional information. A subject in the far environment is unlikely to cause a physical influence such as a collision. For example, it is impossible for the image capturing vehicle to collide within several seconds against a building that is away therefrom by 10 km or more. Thus, a subject in the far environment may be modeled so as to be projected on, for example, the inner side of the circumferential face of the column that defines the nearby space.

Note that the three-dimensional figure that defines the nearby space is not limited to a column. For example, it is not so much necessary to take subjects (vehicles) on the left and right sides into consideration when the vehicle is driving along an expressway with almost no intersection, and thus, for example, the nearby space can be defined by a three-dimensional figure obtained by curving a rectangular parallelepiped according to the road shape.

The environmental model in FIG. 7 is based on a non-zero gravity space. However, even in the case of a zero gravity space, it is possible to use this environmental model by defining the upper-lower direction. For example, the upper-lower direction may be defined using, as a reference, the plane of revolution of the earth or the plane of rotation of the galaxy.

Figure 8:
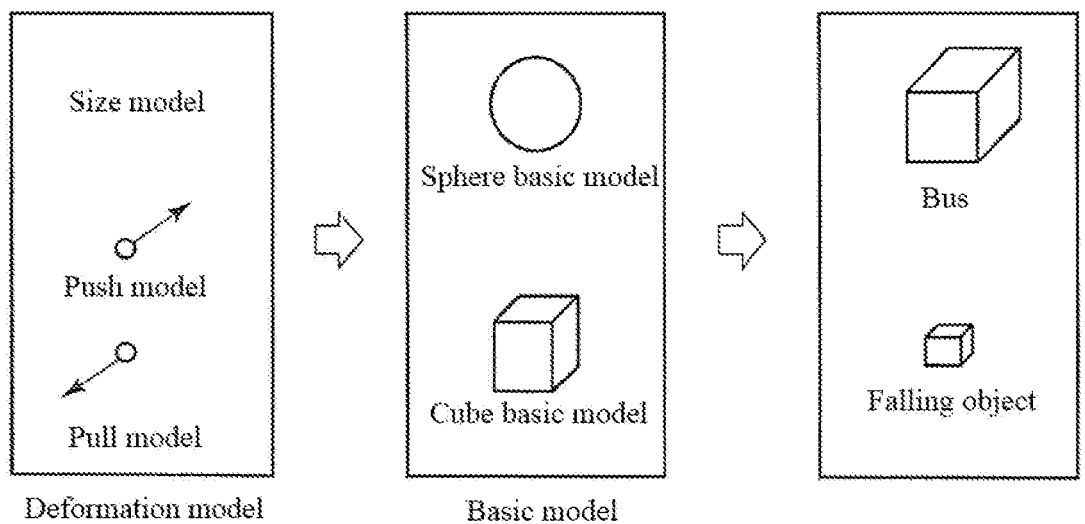
FIG. 8 is an explanatory diagram of object shape models in the example.

In this example, object shape models as shown as an example FIG. 8 may be used to express three-dimensional shapes of objects such as a preceding vehicle, an oncoming vehicle, a falling object, and the like. The object shape models in FIG. 8 are suited to express three-dimensional shapes of moving members, but also can be used to express three-dimensional shapes of structures in the nearby space. In the example in FIG. 8, a sphere basic model and a cube basic model are prepared as basic models. The sphere basic model is a model in which a sphere is set as the predetermined three-dimensional shape, and the cube basic model is a model in which a cube is set as the predetermined three-dimensional shape. Furthermore, in basic models and subjects, a reference direction (orientation) is defined, and this direction is taken as the front (front face). For example, if a subject is a vehicle, the traveling direction in forward travel may be taken as the front.

Note that the number of basic models that can be used is not limited to two, and may be one or may be three or more. For example, a cube can be expressed by deforming a sphere basic model, and thus the cube basic model can be omitted. However, in the case of estimating an angular three-dimensional shape of a vehicle or the like, information regarding deformation may be reduced more using a cube basic model than using a sphere basic model. There is no particular limitation on the three-dimensional shapes of the basic models, but, assuming that the three-dimensional shape of a subject is substantially plane symmetric about a reference plane, the three-dimensional shapes of the basic models are preferably plane symmetric in a similar manner.

In the example in FIG. 8, deformation models are prepared in order to express deformation that is to be applied to a surface of a predetermined three-dimensional shape expressed by a basic model and an actual size of a three-dimensional shape of a subject. The deformation models in FIG. 8 include a size model, a push model, and a pull model. Note that the deformation models that can be used are not limited to those shown as an example in FIG. 8.

The push model is a model for expressing deformation that is to be applied to a surface of a predetermined three-dimensional shape. Specifically, assuming that the surface of the predetermined three-dimensional shape is made of an expandable and contractible film, the push model models expansion or contraction that appears on the surface of the three-dimensional shape when the point of action is displaced along a direction of action by pressing a spherical face against the point of action from the inside of the film. In this case, the direction of action may be a direction that is substantially parallel to a straight line extending from an origin to the point of action, and the origin may be the center point of the predetermined three-dimensional shape.

That is to say, the push model contains positional information indicating the position of the point of action, size information defining the radius of a spherical face that is to be pressed against the point of action, and intensity information expressing the displacement amount of the point of action.

The positional information can be expressed, for example, as two-dimensional information of a rotational angle in the horizontal direction using the front direction as a reference and a rotational angle in the vertical direction using the floor environment as a reference. Note that the positional information may be expressed as three-dimensional information using a rectangular coordinate system or a polar coordinate system. The size information may be a numeric value indicating the radius of the spherical face. The intensity information may be a numeric value indicating the distance in which the point of action is pressed.

The pull model is a model for expressing deformation that is to be applied to a surface of a predetermined three-dimensional shape. Specifically, assuming that the surface of the predetermined three-dimensional shape is made of an expandable and contractible film, the pull model models expansion or contraction that appears on the surface of the three-dimensional shape when the point of action is displaced along a direction of action by pressing a spherical face against the point of action from the outside of the film. The direction of action is defined as in the push model.

That is to say, the pull model contains positional information indicating the position of the point of action, size information defining the radius of a spherical face that is to be pressed against the point of action, and intensity information expressing the displacement amount of the point of action. The information can be defined as in the push model.

It will be appreciated that the push model and the pull model may be considered to model similar deformation except that the directions of action are totally opposite. Thus, the push model and the pull model may be regarded as the same model (push/pull model) if their intensity information is devised. For example, the intensity information of the push/pull model may be a numeric value expressing the distance from the point of action after the displacement to the origin. Alternatively, the intensity information of the push/pull model may be a signed numeric value, wherein the sign of the intensity information indicates whether the direction is the push direction or the pull direction, and the absolute value of the intensity information indicates the displacement amount.

Note that, assuming that the basic model and the three-dimensional shape of the subject are substantially plane symmetric about a reference plane, if the push model and the pull model that are to be applied to the one side (e.g., the right side) of the reference plane are contained in the shape information 11, the push model and the pull model that are to be applied to the other side (the left side) of the reference plane can be omitted from the shape information 11. Accordingly, in the following examples for expressing a three-dimensional shape, a reference will be made to the push model and the pull model that are to be applied to the right side of the reference plane, and will not be made to the push model and the pull model that are to be applied to the left side of the reference plane.

The size model is a model for expressing an actual size of the three-dimensional shape of the subject, and corresponds to the size information described in the first embodiment. The size model may be a numeric value expressing an actual size of the three-dimensional shape of the subject. For example, if the size model is "s" (s is a positive actual value, for example), an estimation result of a three-dimensional shape including an actual size of a subject may be defined with a three-dimensional shape obtained when the above-described deformation is performed in the case where the predetermined three-dimensional shape expressed by the sphere basic model is a sphere with a radius s [m].

If such deformation models are used, it is possible to express various three-dimensional shapes as shown in the examples below.

It is assumed that a predetermined three-dimensional shape expressed by a sphere basic model is a sphere with a radius of 0.5 mm, is pushed using a spherical face with a radius of 0.5 mm by a predetermined distance horizontally in the forward direction at an angle of 45 degrees to the right, and is further pushed using a spherical face with a radius of 0.5 mm by the same distance horizontally in the rearward direction at an angle of 45 degrees to the left. As a result, the predetermined three-dimensional shape can be deformed into a plate-like three-dimensional shape in which the upper face and the bottom face are each substantially in the shape of a square that has rounded corners, and the thickness is 1 mm. In this case, the shape information contains the size information, and the positional information, the size information, and the intensity information of each of the two sets of push deformation.

It is assumed that a predetermined three-dimensional shape expressed by a sphere basic model is a sphere with a radius of 0.5 mm, is pushed using a spherical face with a radius of 0.5 mm by a predetermined distance horizontally in the forward direction at an angle of 30 degrees to the right, and is further pushed using a spherical face with a radius of 0.5 mm by the same distance horizontally in the rearward direction at an angle of 30 degrees to the left. As a result, the predetermined three-dimensional shape can be deformed into a plate-like three-dimensional shape in which the upper face and the bottom face are each substantially in the shape of a quadrangle that has rounded corners and is longer in the front-rear direction than in the left-right direction, and the thickness is 1 mm. In this case, the shape information contains the size information, and the positional information, the size information, and the intensity information of each of the two sets of push deformation.

It is assumed that a predetermined three-dimensional shape expressed by a sphere basic model is a sphere with a radius of 20 cm, and is pushed using a spherical face with a radius of 20 cm by approximately 3 m, each in a forward-right and upper direction, a forward-right and lower direction, a rearward-left and upper direction, and a rearward-left and lower direction. As a result, the predetermined three-dimensional shape can be deformed into a three-dimensional shape such as the shape of a body of a minivan. In this case, the shape information contains the size information, and the positional information, the size information, and the intensity information of each of the four sets of push deformation. If a larger number of sets of deformation are performed, the details of the three-dimensional shape can be adjusted. A wheel well can be expressed by further applying pull deformation. A tire can be expressed by further applying push deformation.

Figure 9:
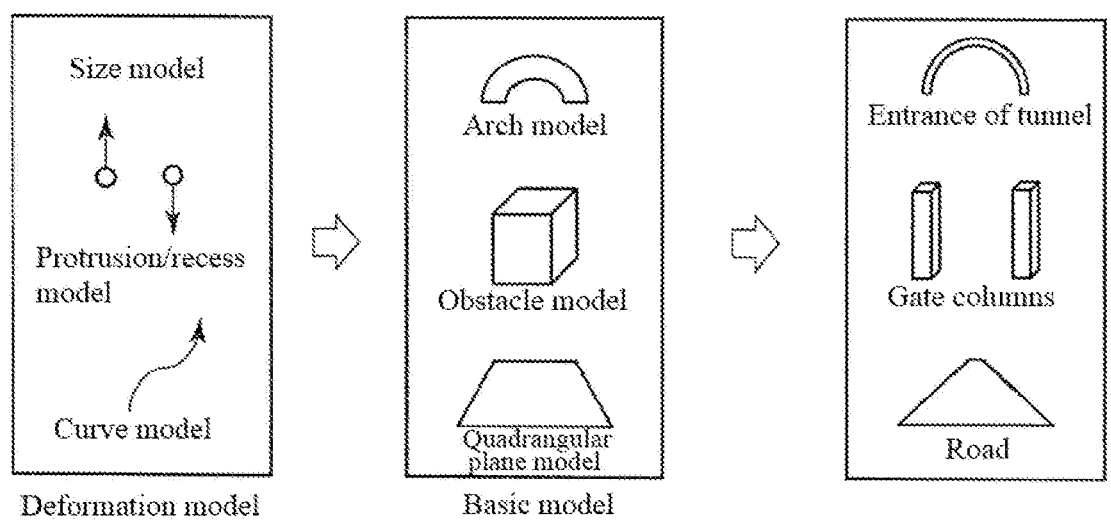
FIG. 9 is an explanatory diagram of space shape models in the example.

In this example, space shape models shown as an example in FIG. 9 may be used in order to express three-dimensional shapes of structures such as (an entrance of) a tunnel, an obstacle, a road, and the like. The space shape models in FIG. 9 are suited to express three-dimensional shapes of structures, but also can be used to express three-dimensional shapes of moving members in the nearby space.

In the example in FIG. 9, an arch model, an obstacle model, and a quadrangular plane model are prepared as basic models. The arch model can be based on an assumption that, for example, a plane figure obtained by removing an inner circle from an outer circle and equally dividing the remaining portion into two portions, or a cylindrical member having this figure as a bottom face is set as the predetermined three-dimensional shape. The obstacle model can be based on an assumption that, for example, a cube is set as the predetermined three-dimensional shape. The quadrangular plane model can be based on an assumption that, for example, an isosceles trapezoid or a cylindrical member having this figure as a bottom face is set as the predetermined three-dimensional shape. The quadrangular plane model is mainly used to express a three-dimensional shape of a road. Even when an image of a road with a constant width is captured, the width of a portion of the road close to the image capturing vehicle looks wider than the width of a portion of the road far from the image capturing vehicle. Thus, in the example in FIG. 9, the quadrangular plane model expresses an isosceles trapezoid in which lengths of the upper side and the lower side are different from each other, but may express other quadrangles.

Note that the number of basic models that can be used is not limited to three, and may be two or less or may be four or more. There is no particular limitation on the three-dimensional shapes of the basic models, but, assuming that the three-dimensional shape of a subject is substantially plane symmetric about a reference plane, the three-dimensional shapes of the basic models are preferably plane symmetric in a similar manner.

In the example in FIG. 9, deformation models are prepared in order to express deformation that is to be applied to a surface of a predetermined three-dimensional shape expressed by a basic model and an actual size of a three-dimensional shape of a subject. The deformation models in FIG. 9 include a size model, a protrusion/recess model, and a curve model. Note that the deformation models that can be used are not limited to those shown as an example in FIG. 9.

The protrusion/recess model is a model for expressing deformation that is to be applied to a surface of a predetermined three-dimensional shape. Specifically, the protrusion/recess model models deformation that generates protrusions and recesses at a given level at a given position (point of action) on the surface of the predetermined three-dimensional shape. That is to say, the protrusion/recess model contains positional information indicating the position of the point of action and intensity information expressing the level of protrusions and recesses that are to be generated at the point of action.

The curve model is a model for expressing deformation that is to be applied to a surface of a predetermined three-dimensional shape. Specifically, the curve model models deformation that curves the surface of the predetermined three-dimensional shape. For example, the three-dimensional shape of a curved road can be simply expressed by curving the three-dimensional shape of the quadrangular plane model.

The size model is a model for expressing an actual size of the three-dimensional shape of the subject, and corresponds to the size information described in the first embodiment. The size model may be a numeric value expressing an actual size of the three-dimensional shape of the subject. A plurality of size models may be prepared. For example, if the size model is "s1" and "s2" (s1 and s2 are each a positive actual value, for example), an estimation result of a three-dimensional shape including an actual size of a subject may be defined with a three-dimensional shape obtained when the above-described deformation is performed in the case where the predetermined three-dimensional shape expressed by the arch model is an arch in which the outer circle and the inner circle respectively have radii of s1 [m] and s2 [m]. Alternatively, an estimation result of a three-dimensional shape including an actual size of a subject may be defined with a three-dimensional shape obtained when the above-described deformation is performed in the case where the predetermined three-dimensional shape expressed by the quadrangular plane model is an isosceles trapezoid in which the upper side and the lower side are respectively s2 [m] and s1 [m].

If the object shape models in FIG. 8 and the space shape models in FIG. 9 are used, the spatial recognition apparatus 320 can generate the scene parameter 33 for expressing a subject such as a preceding vehicle, an oncoming vehicle, an entrance of a tunnel, gate columns, a road, or the like from the scene image 32 obtained by capturing an image ahead of the vehicle. Furthermore, models for expressing the upper environment and the far environment may be further used. If necessary, it is possible to reproduce the scene image 32, by reproducing the three-dimensional shape, the orientation, the position, the texture, and the like of each subject from the scene parameter 33, and capturing an image from a given angle using a virtual camera.

The data structure of the scene parameter may have a flexible design. For example, it may be allowed to apply an extremely large number of sets of deformation or to express fine textures as well. If such a scene parameter is used, it is possible to faithfully express even the details of the subject. On the other hand, if even the details of the subject are faithfully expressed, the data size of the scene parameter increases. The required level of precision of the scene parameter varies depending on the application of the spatial recognition system. For example, when capturing an image of large props and converting it into 3DCG in order to produce a video product, a high level of precision will be required. On the other hand, when estimating an orientation of an oncoming vehicle, it will not be problematic to ignore the shape of a wiper of the oncoming vehicle, as well as the texture of the oncoming vehicle.

The scene parameter may be simplified, for example, as described below. In this case, for the sake of convenience, a scene parameter before simplification is referred to as a full scene parameter, and a scene parameter after simplification is referred to simply as a scene parameter.

Learning data used in machine learning contains input data and supervisor data. The input data is a scene image that looks real, generated with a high level of precision based on a full scene parameter of a sample subject. The supervisor data is a scene parameter obtained, for example, by omitting texture information from the full scene parameter.

A deep neural network acquires a scene image as input data, and recognizes a subject in the scene image. The deep neural network generates a scene parameter as a recognition result.

The spatial recognition learning apparatus trains the deep neural network such that the scene parameter generated by the deep neural network approaches the scene parameter as supervisor data.

Specifically, the spatial recognition learning apparatus may train the deep neural network so as to minimize a difference between a two-dimensional image (also referred to as a "reproduced image") obtained by converting the scene parameter generated by the deep neural network into a two-dimensional image, and the two-dimensional image obtained by converting the scene parameter as supervisor data into a two-dimensional image, instead of the full scene parameter. Note that these scene parameters do not contain the texture information, but, for convenience of conversion into a two-dimensional image, the scene parameters may be required to have the same data format as that of the full scene parameter. In this case, for example, a value corresponding to a grey color may be set as dummy texture information to the scene parameter. For the learning for minimizing a difference between images, for example, an algorithm similar to DCGAN may be used.

If the scene parameter is constituted by a plurality of parameters, and the plurality of parameters are respectively output from the neurons for output of the neural network, a difference from expected output can be calculated during the learning. It is possible to perform learning using the deep neural network by repeatedly changing the parameters of the neural network so as to reduce differences.

Also in the case where, for example, part of information regarding deformation contained in the shape information is omitted instead of the texture information (i.e., the number of sets of deformation applied is reduced), similar machine learning may be performed.

In this example, it was described that, if the spatial recognition system according to the second embodiment is applied to forward looking processing of a vehicle, the three-dimensional shape, the orientation, the position, and the like of a subject such as a preceding vehicle or an oncoming vehicle in a scene can be recognized (modeled) from a scene image obtained by capturing an image ahead of the vehicle. This spatial recognition system can be applied not only to the forward looking processing of a vehicle but also other wide variety of applications.

This spatial recognition system can be used for a computer vision of a robot (regardless of whether or not it is humanoid). Specifically, the spatial recognition system can contribute to an improvement in the level of precision when a robot performs a picking operation or avoids a collision.

According to the spatial recognition system, a robot can recognize a three-dimensional shape of an article that is to be picked. Thus, for example, driving of a finger or an arm of a robot can be controlled according to the three-dimensional shape of the article, so that the robot can perform a precise picking operation while placing the finger or the arm at an appropriate position for holding the article.

Furthermore, according to the spatial recognition apparatus, the robot can recognize a three-dimensional shape of a nearby object. Thus, the robot can move, for example, while wisely avoiding a collision against a nearby object. Furthermore, the robot can recognize an obstacle that appears in an image of a vehicle-mounted camera or a surveillance camera, and drive the vehicle into a parking lot or park the vehicle by controlling the vehicle so as not to collide against the obstacle. Furthermore, when assembling a product, the robot can change the orientation of a part as appropriate or correctly identify the type of part, based on the three-dimensional information of the part.

This spatial recognition system is useful also as an application that is installed on a camera-attached information processing apparatus such as a smartphone. For example, a seller can perform a selling activity with a higher visual effect by providing a three-dimensional shape of a product. Specifically, the seller captures an image of a product using a smartphone functioning as a spatial recognition apparatus, and obtains a scene parameter generated from the image. The seller can recommend the product while showing a customer a three-dimensional shape of the product reproduced from the scene parameter. The scene parameter may be transmitted to a smartphone of the customer. In this case, the customer can view the three-dimensional image of the product by operating his or her smartphone.

This spatial recognition system is useful also for generating input data of a 3D printer. Specifically, a scene parameter of a subject targeted for 3D printing can be generated from a plurality of scene images of the subject captured at a plurality of angles. Furthermore, the three-dimensional shape can be precisely estimated through machine learning using the plurality of scene images. If the thus generated scene parameter is converted, for example, using software so as to be suitable for an input data format of a 3D printer, input data for performing 3D printing of the subject can be generated.

This spatial recognition system can be applied to a target identifying apparatus for identifying a subject. Specifically, as in the case of the spatial recognition system, the target identifying apparatus can generate shape information indicating a three-dimensional shape of a subject and orientation information indicating an orientation of the subject, from a scene image of the subject. The target identifying apparatus can identify the subject with a high level of precision, by using the shape information and the orientation information.

For example, the target identifying apparatus can identify a product name of a drink box substantially in the shape of a rectangular parallelepiped, from a captured image of the drink box. First, the target identifying apparatus recognizes the three-dimensional shape and the orientation of the drink box from a scene image of the drink box captured at a given angle. If an image of a subject substantially in the shape of a rectangular parallelepiped is captured, one to three faces appear in the image depending on the angle. Thus, the target identifying apparatus can reproduce part of the texture of the subject on a recognized three-dimensional model by pasting a scene image of the subject to the one to three faces of the three-dimensional shape. Then, the target identifying apparatus searches catalog data or a product database storing, for example, images of front faces or other faces of drink products, and specifies a drink product (and its manufacturer) associated with an image that is most similar to the image of a front face or another face of the subject. The target identifying apparatus generates information (e.g., product name) indicating the specified drink product, as subject identifying information.

Note that the target identifying apparatus may also identify a subject having a three-dimensional shape that is not approximated to a prism such as a rectangular parallelepiped. For example, the target identifying apparatus can identify a vehicle model of a vehicle, from a captured image of the vehicle. First, the target identifying apparatus recognizes the three-dimensional shape and the orientation of the vehicle from a scene image of the vehicle captured at a given angle. Then, the target identifying apparatus searches catalog data or a product database storing shape information and texture information of vehicles, and specifies one or more vehicle models (and their manufacturers) associated with one or more pieces of shape information that are similar to the shape information of the subject. The target identifying apparatus performs mapping such that part of textures indicated by texture information respectively associated with the specified vehicle models can be compared with the scene image, based on the orientation information of the subject. The target identifying apparatus generates information (e.g., vehicle model name) indicating a vehicle model associated with a texture that is most similar to the scene image, as subject identifying information.

As described above, the spatial recognition system can be applied to a target identifying apparatus for identifying a subject, but the target identifying apparatus can be used, for example, to estimate the distance from the subject. Specifically, the target identifying apparatus recognizes the three-dimensional shape including the actual size and the orientation of the subject from a scene image of the subject, and identifies, for example the vehicle model of that subject through that recognition. The target identifying apparatus can search for the actual size of the identified vehicle model, for example, from catalog data or a product database, and estimate how far the position when the scene image was captured was from the subject, that is, the distance from the subject, based on the searched actual size, the three-dimensional shape and the orientation of the subject, and the scene image. Note that, when roughly estimating the distance, it is sufficient that the subject can be roughly identified. For example, even if the identification is not performed at the level of vehicle models, the identification at the level of vehicle classifications (compact car, mid-size car, etc.) may be sufficient to roughly estimate an actual size of a subject, and thus it is possible to estimate the distance as well precisely to some extent. With this application example, it is possible to estimate a distance from a two-dimensional image, without using a range apparatus such as a laser radar.

Third Embodiment

A third embodiment is directed to a service providing system for allowing a user to use functions of the object recognition, the spatial recognition, and the target identification described in the second embodiment. The service providing system is shown as an example in FIG. 10.

Figure 10:
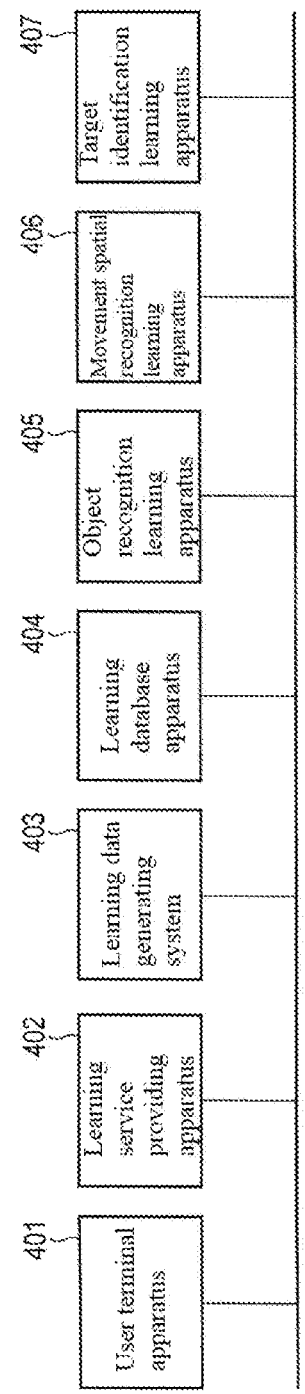
FIG. 10 is a block diagram showing an example of a service providing system according to a third embodiment.

The service providing system in FIG. 10 includes a user terminal apparatus 401, a learning service providing apparatus 402, a learning data generating system 403, a learning database apparatus 404, an object recognition learning apparatus 405, a movement spatial recognition learning apparatus 406, and a target identification learning apparatus 407.

Note that the apparatus configuration of the service providing system in FIG. 10 is merely an example. That is to say, some or all of the apparatuses shown in FIG. 10 may be combined into one apparatus, or the function of any of the apparatuses shown in FIG. 10 may be divided into a plurality of apparatuses.

Figure 18:
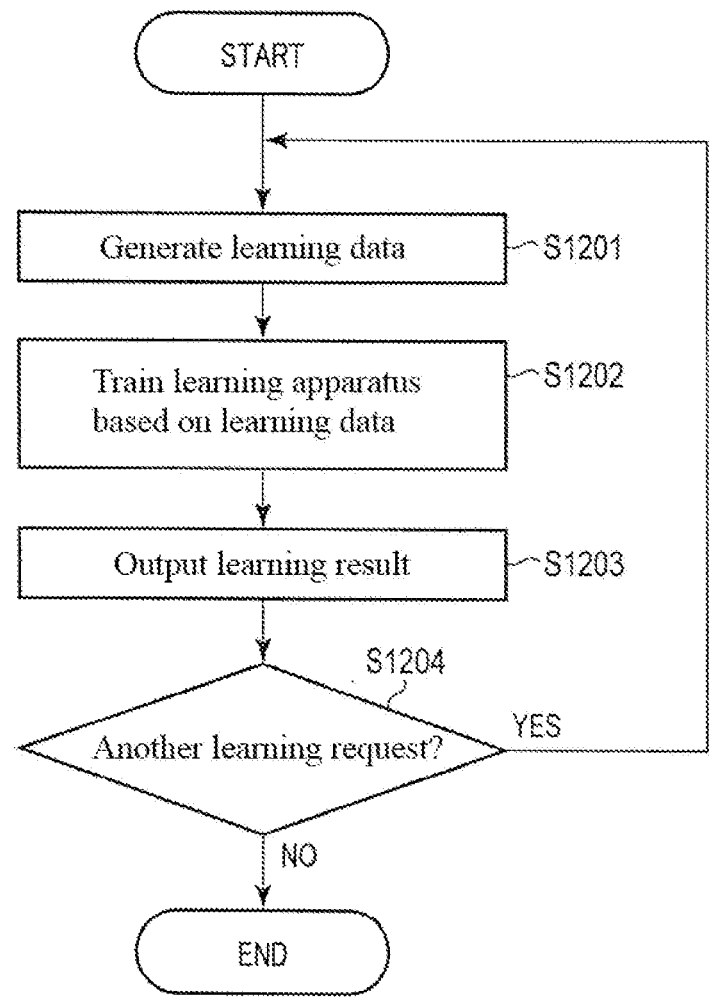
FIG. 18 is a flowchart illustrating an example of an operation of the service providing system in FIG. 10.

FIG. 18 shows an example of an operation of the service providing system in FIG. 10. The operation in FIG. 18 starts when the learning service providing apparatus 402 receives learning request information from a user, and the procedure advances to step S1201.

In step S1201, the learning data generating system 403 generates learning data (e.g., a scene parameter and a scene image of a vehicle) suitable for an intension (some or all of the object recognition, the movement spatial recognition and the target identification) of the user based on the learning request information, and registers it to the learning database apparatus 404.

At least one learning apparatus suitable for the intension of the user among the object recognition learning apparatus 405, the movement spatial recognition learning apparatus 406, and the target identification learning apparatus 407 acquires the learning data generated in step S1201 from the learning database apparatus 404, and performs machine learning (step S1202).

The learning apparatus that performed machine learning in step S1202 outputs a learning parameter as a learning result to the user terminal apparatus 401 (step S1203). Note that the learning parameter may be output to the user terminal apparatus 401 via the learning service providing apparatus 402 or another apparatus.

If there is still another learning request that is to be processed after step S1203 has been ended, the procedure returns to step S1201, and, if not, the operation in FIG. 18 is ended.

Note that, in the operation example in FIG. 18, processing from generating learning data to performing machine learning is performed according to the learning request from the user, but, if learning data suitable for the intension of the user has been generated, it is not necessary to newly generate learning data. Furthermore, if a learning parameter suitable for the intension of the user has been adjusted, it is not necessary to newly perform machine learning.

The user terminal apparatus 401 requests the learning service providing apparatus 402 to provide a learning service suitable for the intension of the user. Then, the user terminal apparatus 401 receives the learning result suitable for the intension of the user. The user terminal apparatus 401 can use a function suitable for the intension of the user, by setting the received learning result to the deep neural network included in the user terminal apparatus 401. If the intension of the user is more satisfied through shape estimation, the received learning result can be more suitable for the intension if it includes a shape estimating ability. For example, if a user selects a learning menu provided as a learning service, a learning program of a learning apparatus that is called to perform learning may be caused to perform learning processing in the first embodiment or the second embodiment.

If a menu at the time of a learning request contains request information defining shape information, such as conditions of allowable differences, the number of polygons, or types and ranges of values of information such as positional information and intensity information, it is possible to provide a learning result more suitable for the intension of the user.

The user terminal apparatus 401 may be, for example, digital cameras, surveillance cameras, automobiles, smartphones, PCs (personal computers), smart watches, wearable devices, home electronics, health equipment, medical equipment, business terminals, public terminals, audio terminals, automobile consoles, head-up displays, telematics terminals, or the like.

Figure 11:
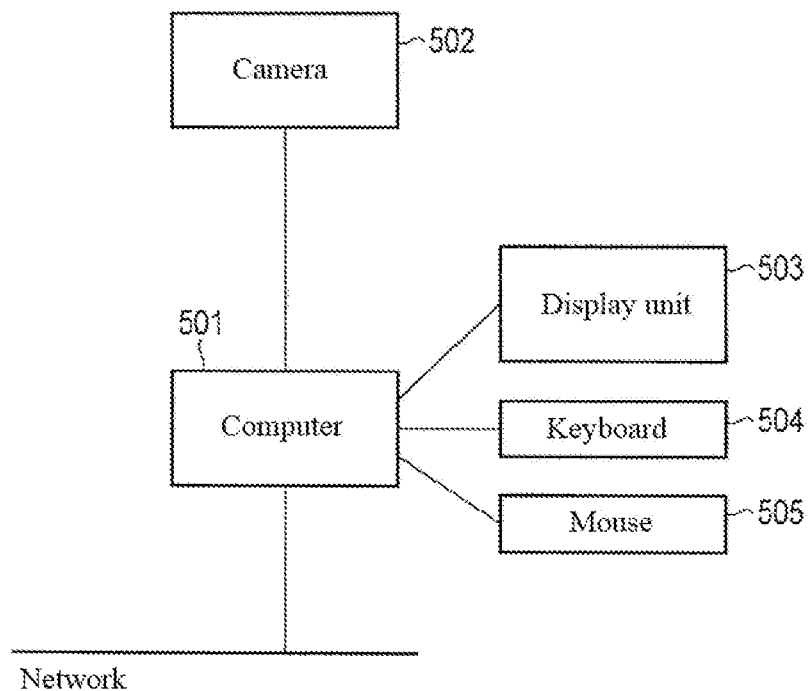
FIG. 11 is a block diagram showing an example of a hardware configuration of a user terminal apparatus in FIG. 10.

As shown in the example in FIG. 11, the user terminal apparatus 401 includes a computer 501, a camera 502, a display unit 503, a keyboard 504, and a mouse 505.

The computer 501 is connected to a network, and can exchange data with another apparatus in FIG. 10. The computer 501 includes a communication unit for exchanging data with another apparatus via the network.

The computer 501 includes a deep neural network to which a learning result obtained by the object recognition learning apparatus 405, the movement spatial recognition learning apparatus 406, or the target identification learning apparatus 407 in FIG. 10 is set.

The deep neural network is realized, for example, by a processor such as an unshown GPU (graphics processing unit) or CPU (central processing unit) included in the computer 501 executing a program stored in a memory. A learning result suitable for the intension of the user is set to the deep neural network. For example, if a learning result is set, the deep neural network can attain some or all of abilities for the object recognition, the movement spatial recognition, and the target identification.

The camera 502 generates a scene image corresponding to input data of the deep neural network in the computer 501.

The display unit 503 displays scene images captured using the camera 502, reproduced images based on scene parameters generated by the deep neural network in the computer 501, and the like. Moreover, the display unit 503 may display web browsers or other application screens. The display unit 503 is, for example, a liquid crystal display, an organic EL (electroluminescence) display, a CRT (cathode ray tube) display, or the like. Note that the display unit 503 may include the function of an input device such as a touch screen.

The keyboard 504 and the mouse 505 are input devices for accepting user input. Note that the user terminal apparatus 401 may include input devices other than the keyboard 504 and the mouse 505, or may not include one or both of the keyboard 504 and the mouse 505.

In the service providing system in FIG. 10, apparatuses included in the learning service providing apparatus 402 and the learning data generating system 403, and the learning database apparatus 404 may be referred to as server-type apparatuses. The hardware configuration common to the server-type apparatuses is shown as an example in FIG. 12.

Figure 12:
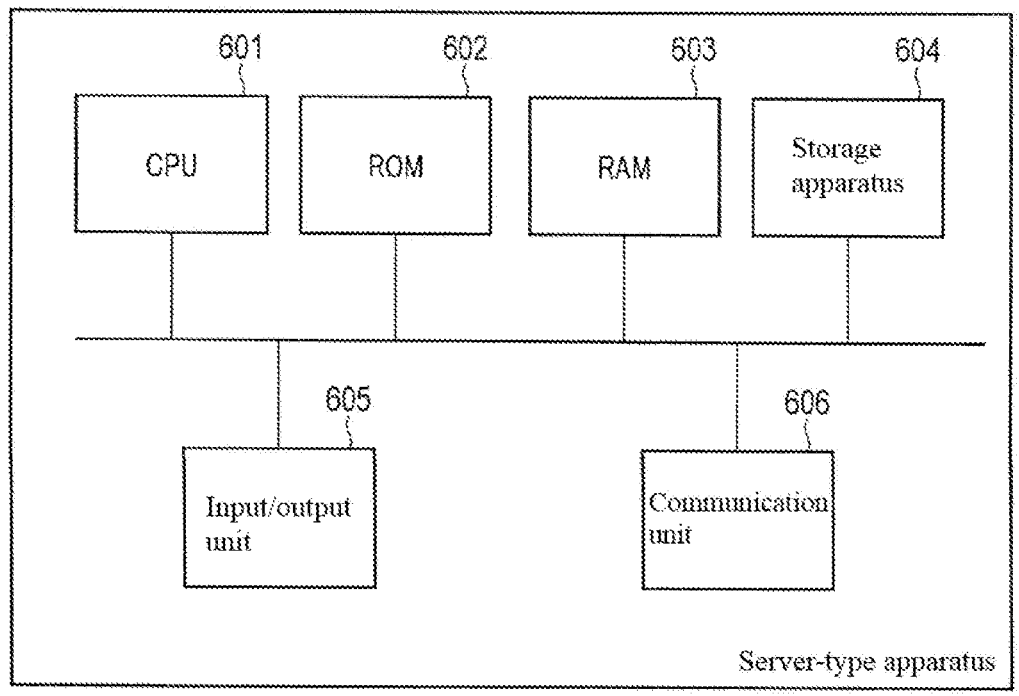
FIG. 12 is a block diagram showing an example of a hardware configuration common to the server-type apparatuses included in the service providing system in FIG. 10.

The server-type apparatus in FIG. 12 includes a CPU 601, a ROM 602, a RAM 603, a storage apparatus 604, an input/output unit 605, and a communication unit 606.

The CPU 601 executes a program stored in the ROM (read only memory) 602 or the RAM (random access memory) 603. The ROM 602 and the RAM 603 respectively correspond to a non-volatile and a volatile memory, and store programs that are to be executed by the CPU 601 or data that is to be used by the CPU 601.

The storage apparatus 604 is also referred to as an auxiliary storage apparatus, and can store typically more programs or data compared with a memory. The storage apparatus 604 is, for example, an HDD (hard disk drive), an SSD (solid state drive), or the like, but there is no limitation to this.

The input/output unit 605 accepts user input, or provides an application processing result to a user. The input/output unit 605 can include some or all of input devices such as a keyboard, a mouse, and a numeric keypad, output devices such as a display and a printer, and input/output devices such as a touch screen.

The communication unit 606 exchanges data via a network with an apparatus different from the learning service providing apparatus 402. The communication unit 606 is a module or a device capable of performing one or both of wireless communication and wired communication.

Figure 13:
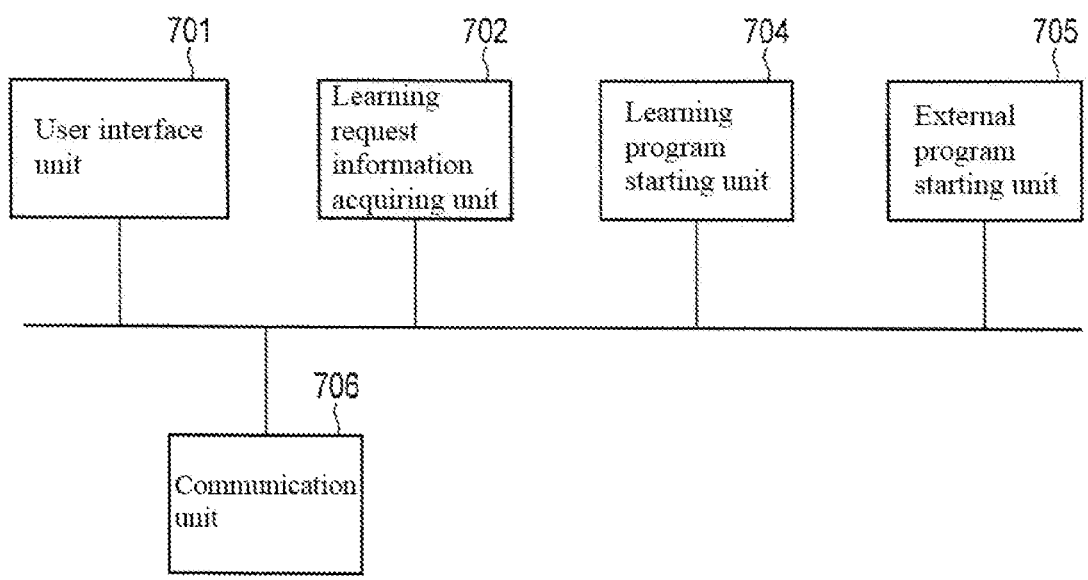
FIG. 13 is a block diagram showing an example of a functional configuration of a learning service providing apparatus in FIG. 10.

The functional configuration of the learning service providing apparatus 402 is shown as an example in FIG. 13. The learning service providing apparatus 402 in FIG. 13 includes a user interface unit 701, a learning request information acquiring unit 702, a learning program starting unit 704, an external program starting unit 705, and a communication unit 706.

The user interface unit 701 accepts user input, or provides an application processing result to a user. The learning request information acquiring unit 702 acquires learning request information from the user. Machine learning suitable for the intension of the user is performed using acquisition of the learning request information as a trigger.

The learning program starting unit 704 starts a learning program for performing machine learning suitable for the intension of the user, using acquisition of the learning request information as a trigger. The external program starting unit 705 remotely starts, via a network, a program stored in a memory of an apparatus different from the learning service providing apparatus 402.

The communication unit 706 exchanges data via a network with an apparatus different from the learning service providing apparatus 402. The communication unit 706 can perform one or both of wireless communication and wired communication.

Figure 14:
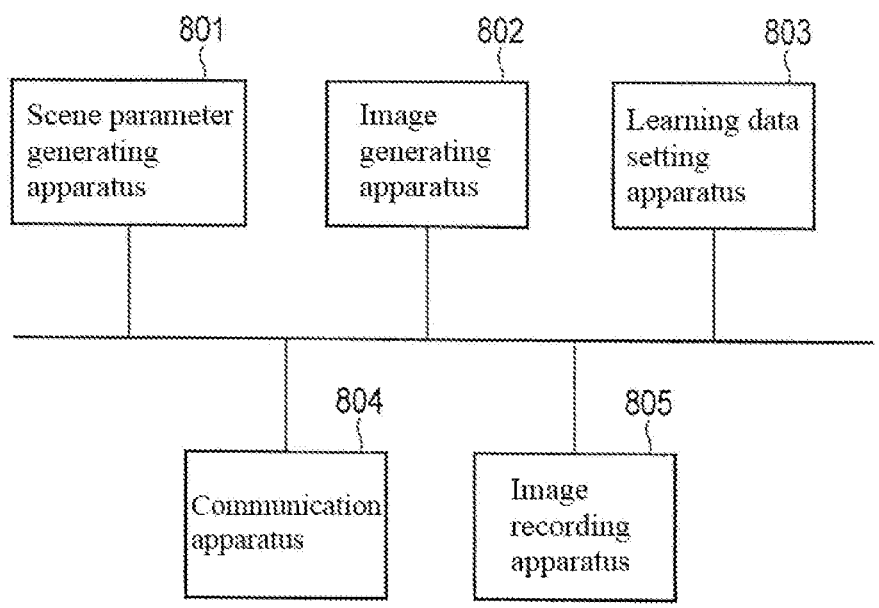
FIG. 14 is a block diagram showing an example of a learning data generating system in FIG. 10.

As shown in the example in FIG. 14, the learning data generating system 403 includes a scene parameter generating apparatus 801, an image generating apparatus 802, a learning data setting apparatus 803, a communication apparatus 804, and an image recording apparatus 805.

The scene parameter generating apparatus 801 generates a scene parameter of a sample subject for learning. The image generating apparatus 802 renders a three-dimensional shape of the sample subject based on the scene parameter, thereby generating a scene image of the sample subject. The scene image is recorded in the image recording apparatus 805.

The learning data setting apparatus 803 sets learning data using the scene parameter and the scene image of the sample subject respectively as supervisor data and input data. Note that the learning data setting apparatus 803 may set supervisor data after part of the scene parameter (e.g., texture information, part of information regarding deformation contained in the shape information, etc.) is omitted, as described above. The learning data setting apparatus 803 registers the set learning data to the learning database apparatus 404.

The communication apparatus 804 exchanges data via a network with an apparatus different from the learning data generating system 403. The communication apparatus 804 is a device capable of performing one or both of wireless communication and wired communication.

The learning data may be generated by the learning data generating system 403 after the learning request information from the user has been acquired, or may be generated in advance for a sample subject regarding which a request is expected to be issued.

In the service providing system in FIG. 10, the object recognition learning apparatus 405, the movement spatial recognition learning apparatus 406, and the target identification learning apparatus 407 are the same in that they are learning apparatuses, although they perform machine learning in order to attain different abilities (object recognition ability, movement spatial recognition ability, and target identify ability). The hardware configuration common to the learning apparatuses is shown as an example in FIG. 15, the functional configuration common thereto is shown as an example in FIG. 16, and the operation common thereto is shown as an example in FIG. 19.

Figure 15:
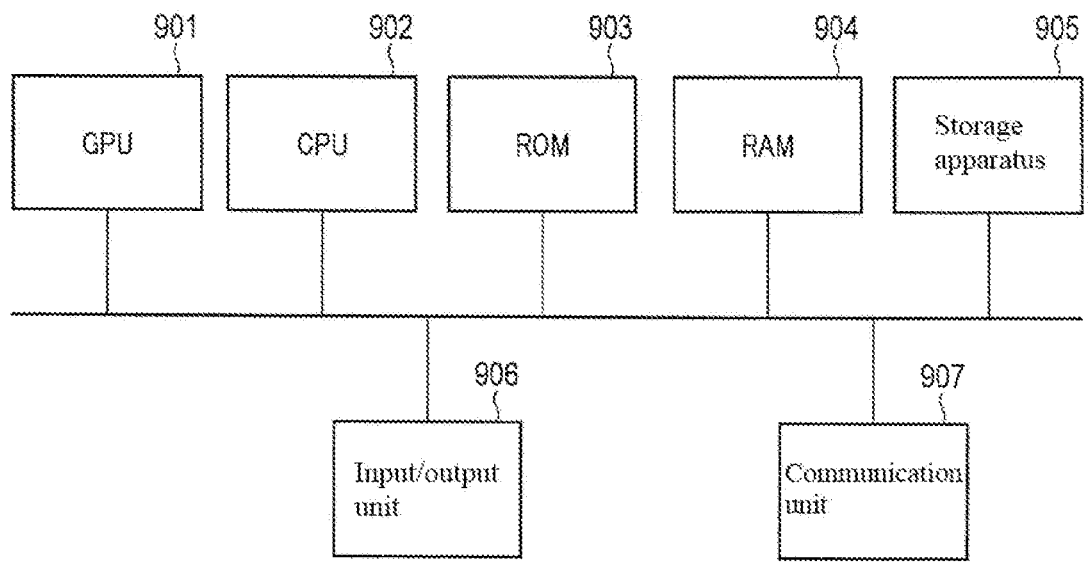
FIG. 15 is a block diagram showing an example of a hardware configuration common to learning apparatuses in FIG. 10.

The learning apparatus in FIG. 15 includes a GPU 901, a CPU 902, a ROM 903, a RAM 904, a storage apparatus 905, an input/output unit 906, and a communication unit 907.

The GPU 901 executes at high speed calculation (mainly matrix products) of the deep neural network realized by the learning apparatus in FIG. 15. The GPU 901 is also referred to as an accelerator.

The CPU 902 executes a program stored in the ROM 602 or the RAM 603. The ROM 903 and the RAM 904 respectively correspond to a non-volatile and a volatile memory, and store programs that are to be executed by the CPU 902 or data that is to be used by the CPU 902.

The storage apparatus 905 is also referred to as an auxiliary storage apparatus, and can store typically more programs or data compared with a memory. The storage apparatus 905 is, for example, an HDD, an SSD, or the like, but there is no limitation to this.

The input/output unit 906 accepts user input, or provides an application processing result to a user. The input/output unit 906 can include some or all of input devices such as a keyboard, a mouse, and a numeric keypad, output devices such as a display and a printer, and input/output devices such as a touch screen.

The communication unit 907 exchanges data via a network with an apparatus different from the learning apparatus in FIG. 15. The communication unit 907 is a module or a device capable of performing one or both of wireless communication and wired communication.

Figure 16:
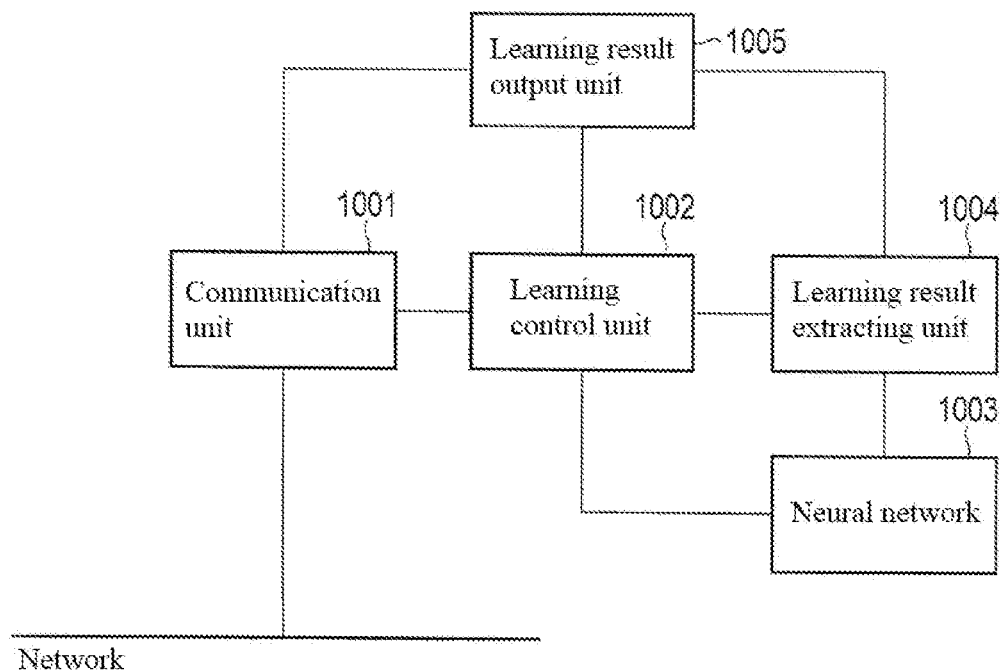
FIG. 16 is a block diagram showing an example of a functional configuration common to the learning apparatuses in FIG. 10.

The learning apparatus in FIG. 16 includes a communication unit 1001, a learning control unit 1002, a neural network 1003, a learning result extracting unit 1004, and a learning result output unit 1005.

The communication unit 907 exchanges data via a network with an apparatus different from the learning apparatus in FIG. 16. For example, the communication unit 907 may receive a learning start command, access the learning database apparatus 404 and acquire necessary learning data, and transmit a learning parameter as a learning result to the user terminal apparatus 401.

The learning control unit 1002 starts learning using receiving of the learning start command as a trigger. The learning control unit 1002 requests the learning database apparatus 404 for learning data related to a target designated by the learning start command (i.e., suitable for the intension of the user), via the communication unit 1001. The learning control unit 1002 sets a model for performing machine learning related to the target designated by the learning start command, to the neural network 1003.

The learning control unit 1002 provides the neural network 1003 with the learning data acquired from the learning database apparatus 404, and trains the neural network 1003. If the neural network 1003 reaches a predetermined learning level, the learning control unit 1002 causes the learning result extracting unit 1004 to extract a learning parameter as a learning result. The learning control unit 1002 causes the learning result output unit 1005 to output the extracted learning parameter. Note that the learning control unit 1002 may stop the learning under a predetermined condition.

Figure 17:
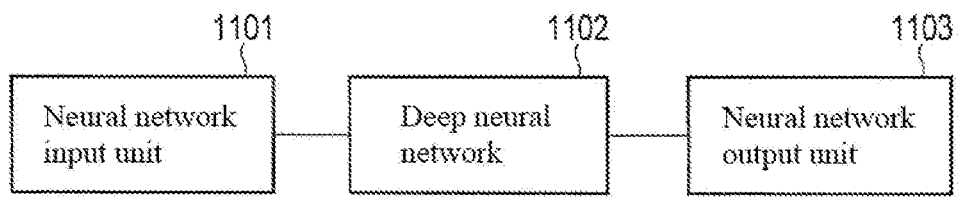
FIG. 17 is a block diagram showing an example of a neural network in FIG. 16.

As shown in the example in FIG. 17, the neural network 1003 includes a neural network input unit 1101, a deep neural network 1102, and a neural network output unit 1103.

The neural network input unit 1101 receives a scene image as input data from the learning control unit 1002, and transmits it to the deep neural network 1102. The deep neural network 1102 generates a scene parameter based on the input scene image. The neural network output unit 1103 returns the generated scene parameter as output data to the learning control unit 1002.

The learning result extracting unit 1004 extracts a learning parameter that has been set to the neural network after the learning of the neural network 1003 is ended, according to an instruction from the learning control unit 1002, and transmits it to the learning result output unit 1005.

The learning result output unit 1005 receives the learning parameter from the learning result extracting unit 1004, performs necessary processing such as packetization, and outputs the processing result to the user terminal apparatus 401 or another apparatus, via the communication unit 1001.

Figure 19:
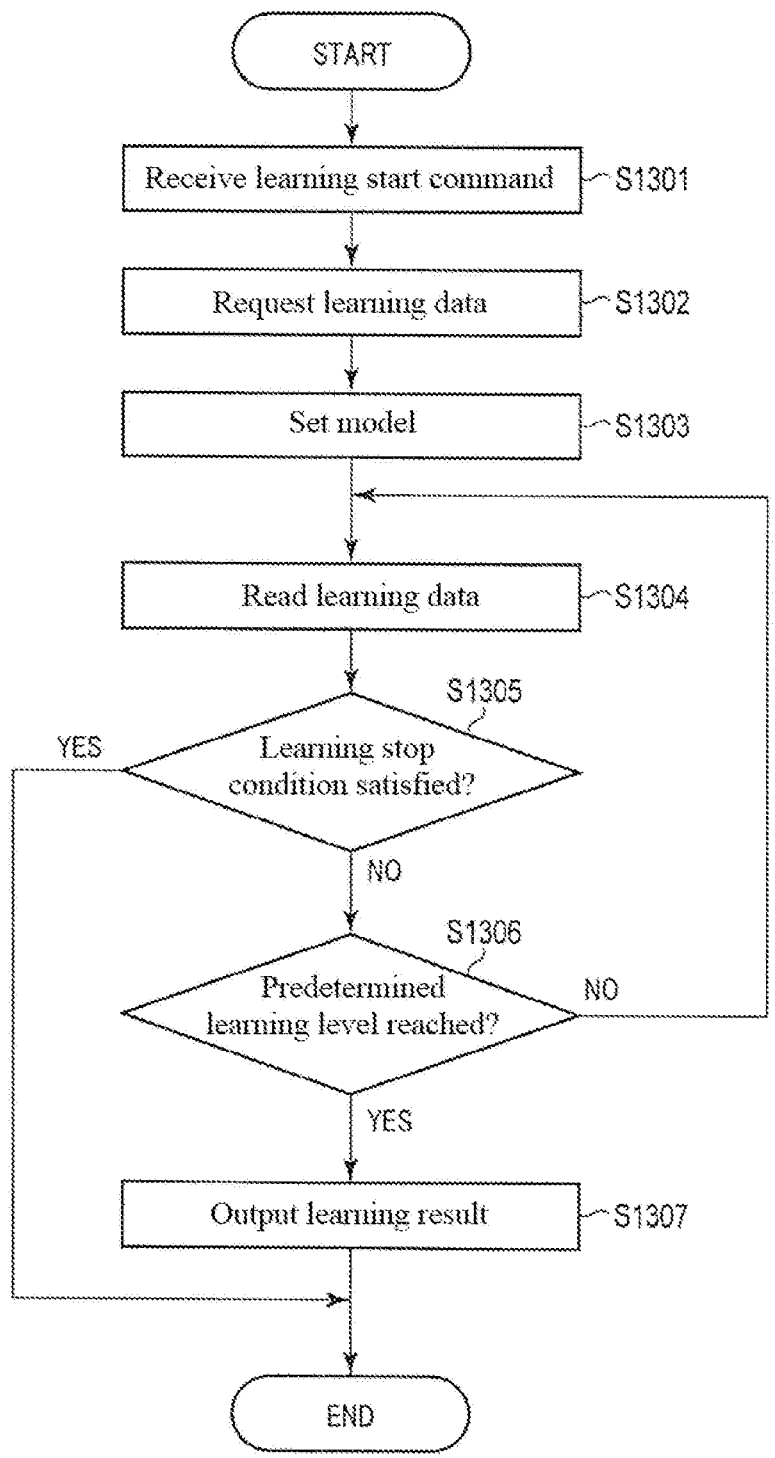
FIG. 19 is a flowchart illustrating an example of an operation common to the learning apparatuses in FIG. 10.

Hereinafter, operations of the learning apparatuses will be described with reference to FIG. 19.

First, the learning control unit 1002 receives a learning start command via the communication unit 1001 (step S1301). The learning control unit 1002 requests the learning database apparatus 404 for learning data related to the target designated by the learning start command, via the communication unit 1001 (step S1302). Furthermore, the learning control unit 1002 sets a model for performing machine learning related to the target designated by the learning start command, to the neural network 1003 (step S1303). After the processing in steps S1302 and S1303 has been ended, the procedure advances to step S1304.

In step S1304, the learning control unit 1002 reads predetermined units of the learning data acquired from the learning database apparatus 404, and trains the neural network 1003 through machine learning. The learning control unit 1002 repeatedly performs step S1304 until a predetermined learning stop condition is satisfied (step S1305) or the neural network 1003 reaches a predetermined learning level (step S1306). If the neural network 1003 reaches a predetermined learning level, the learning result extracting unit 1004 extracts a learning parameter as a learning result, and the learning result output unit 1005 outputs the learning parameter, and then the operation in FIG. 19 is ended (step S1307).

As described above, the service providing system according to the third embodiment performs machine learning for attaining an ability to perform estimation, recognition, identification, and the like based on a two-dimensional image, in response to a request from a user, and sets the learning result to a deep neural network included in a user terminal. Thus, according to this service providing system, a user can use a deep neural network having an ability suitable for an intension of the user, without training his or her user terminal through machine learning.

The foregoing embodiments merely show specific examples for facilitating understanding of the concept of the present invention, and are not intended to limit the scope of the invention. Various additions, deletions, and modifications can be made to constituent elements of the invention without departing from the gist thereof.

The various functional units described in the foregoing embodiments may be realized by using a circuit. Such a circuit may be a dedicated circuit for realizing a specific function or may be a general-purpose circuit such as a processor.

At least part of the processing in the foregoing embodiments may also be realized by using a general-purpose computer as base hardware. A program for realizing the above-described processing may be provided in a form where it is stored in a computer-readable storage medium. The program is stored in a storage medium as an installable file or an executable file. Examples of the storage medium include a magnetic disk, an optical disk (CD-ROM, CD-R, DVD, etc.), a magneto-optical disk (MO, etc.), a semiconductor memory, and the like. There is no limitation on the storage medium as long as it is a computer-readable storage medium that can store programs. Furthermore, the program for realizing the above-described processing may be stored in a computer (server) connected to a network such as the Internet, and downloaded to a computer (client) via the network.

Note that part of or the entirety of the foregoing embodiments may be described as in Additional Remark below as well as in Claims, but there is no limitation to this.

Additional Remark 1

A shape estimating apparatus including:
  a memory; and
  a processor connected to the memory,
  wherein the processor is configured to:
    (a) acquire a two-dimensional image; and
    (b) provide artificial intelligence with the two-dimensional image, and use the artificial intelligence to estimate a three-dimensional shape of a subject of the two-dimensional image, and
  a learning result of machine learning performed using learning data containing supervisor data expressing a three-dimensional shape of a sample subject and a sample two-dimensional image obtained by capturing an image of the three-dimensional shape of the sample subject is set to the artificial intelligence.

Additional Remark 2

A shape estimating method including;
  (a) acquiring, by a processor connected to the memory, a two-dimensional image;
  (b) providing, by the processor, artificial intelligence with the two-dimensional image; and
  (c) using, by the processor, the artificial intelligence to estimate a three-dimensional shape of a subject of the two-dimensional image, wherein
  a learning result of machine learning performed using learning data containing supervisor data expressing a three-dimensional shape of a sample subject and a sample two-dimensional image obtained by capturing an image of the three-dimensional shape of the sample subject is set to the artificial intelligence.

The invention claimed is:

1. A shape estimating apparatus comprising: a processor configured with a program to perform operations comprising:
operation as an acquiring unit configured to acquire a two-dimensional image; and
operation as an estimating unit comprising artificial intelligence, configured to provide the artificial intelligence with the two-dimensional image and to estimate with the artificial intelligence, a three-dimensional shape of a subject of the two-dimensional image, wherein
the processor is configured with the program to perform operations such that:
operation as the estimating unit comprises applying, to the artificial intelligence, a learning result of machine learning performed using learning data comprising supervisor data expressing a three-dimensional shape of a sample subject and a sample two-dimensional image obtained by capturing an image of the three-dimensional shape of the sample subject; and
operation as the estimating unit comprises estimating with the artificial intelligence a three-dimensional shape of the subject of the two-dimensional image to obtain shape information describing the three-dimensional shape,
the three-dimensional shape of the subject of the two-dimensional image is substantially plane symmetric about a reference plane, and
the shape information comprises, for each deformation that is to be applied to one side of the reference plane on a surface of a predetermined three-dimensional shape expressed by a basic model, positional information and intensity information respectively defining a position and an intensity of the deformation, and excludes the positional information and the intensity information that is to be applied to another side of the reference plane on the surface of the predetermined three-dimensional shape.

2. The shape estimating apparatus according to claim 1, wherein the shape information further comprises contains size information defining an actual size of the three-dimensional shape of the subject of the two-dimensional image.

3. The shape estimating apparatus according to claim 1, wherein the deformation comprises a first type of deformation for displacing a point of action indicated by the positional information on the surface of the predetermined three-dimensional shape, by an amount indicated by the intensity information, along a direction of action that is substantially parallel to a straight line extending from a predetermined origin to the point of action.

4. The shape estimating apparatus according to claim 3, wherein the first type of deformation comprises expansion or contraction that appears on the surface of the predetermined three-dimensional shape in response to the point of action being displaced along the direction of action by the amount indicated by the intensity information on an assumption that the surface of the predetermined three-dimensional shape comprises an expandable and contractible film.

5. The shape estimating apparatus according to claim 4, wherein, assuming that the surface of the predetermined three-dimensional shape comprises is an expandable and contractible film, the first type of deformation comprises expansion or contraction that appears on the surface of the predetermined three-dimensional shape in response to the point of action being displaced along the direction of action by the amount indicated by the intensity information, by pressing a curved face against the point of action from the inside or outside of the film.

6. The shape estimating apparatus according to claim 5, wherein the shape information further comprises size information defining a size of the curved face.

7. The shape estimating apparatus according to claim 1, wherein the processor is configured with the program to perform operations such that the machine learning comprises:
providing artificial intelligence for learning with the sample two-dimensional image and training the artificial intelligence for learning to estimate the three-dimensional shape of the sample subject based on a learning parameter of the artificial intelligence for learning;
generating a reproduced image obtained by capturing an image of an estimated three-dimensional shape of the sample subject rendered based on an estimation result of the three-dimensional shape of the sample subject; and
updating the learning parameter of the artificial intelligence for learning such that the reproduced image becomes similar to the sample two-dimensional image.

8. The shape estimating apparatus according to claim 1, wherein the processor is configured with the program to perform operations such that operation as the estimating unit comprises generating orientation information indicating a difference from a reference orientation of the subject.

9. A shape estimating method comprising:
acquiring, by a computer, a two-dimensional image;
providing, by the computer, an artificial intelligence with the two-dimensional image;
estimating, by the computer, with the artificial intelligence, a three-dimensional shape of a subject of the two-dimensional image, wherein
estimating, by the computer, with the artificial intelligence, the three-dimensional shape comprises applying, to the artificial intelligence, a learning result of machine learning performed using learning data containing supervisor data expressing a three-dimensional shape of a sample subject and a sample two-dimensional image obtained by capturing an image of the three-dimensional shape of the sample subject,
the method further comprises using estimating, by the computer, with the artificial intelligence, a three-dimensional shape of the subject of the two-dimensional image to obtain, shape information describing the three-dimensional shape,
three-dimensional shape of the subject of the two-dimensional image is substantially plane symmetric about a reference plane, and
the shape information comprises, for each deformation that is to be applied to one side of the reference plane on a surface of a predetermined three-dimensional shape expressed by a basic model, positional information and intensity information respectively defining a position and an intensity of the deformation, and excludes the positional information and the intensity information regarding deformation that is to be applied to another side of the reference plane on the surface of the predetermined three-dimensional shape.

10. The method according to claim 9, wherein the shape information further comprises size information defining an actual size of the three-dimensional shape of the subject of the two-dimensional image.

11. The method according to claim 9, wherein the deformation comprises a first type of deformation for displacing a point of an action indicated by the positional information the surface of the predetermined three-dimensional shape, by an amount indicated by the intensity information, along a direction of action that is substantially parallel to a straight line extending from a predetermined origin to the point of action.

12. The method according to claim 11, wherein the first type of deformation comprises expansion or contraction that appears on the surface of the predetermined three-dimensional shape in response to the point of action being displaced along the direction of action by the amount indicated by the intensity information on an assumption that the surface of the predetermined three-dimensional shape comprises an expandable and contractible film.

13. The method according to claim 12, wherein, assuming that the surface of the predetermined three-dimensional shape comprises an expandable and contractible film, the first type of deformation comprises expansion or contraction that appears on the surface of the predetermined three-dimensional shape in response to the point of action being displaced along the direction of action by the amount indicated by the intensity information, by pressing a curved face against the point of action from the inside or outside of the film.

14. The method according to claim 13, wherein the shape information further comprises size information defining a size of the curved face.

15. The method according to claim 9, further comprising:
providing an artificial intelligence for learning with the sample two-dimensional image and training the artificial intelligence for learning to estimate the three-dimensional shape of the sample subject based on a learning parameter of the artificial intelligence for learning;
generating a reproduced image obtained by capturing an image of an estimated three-dimensional shape of the sample subject rendered based on an estimation result of the three-dimensional shape of the sample subject; and
updating the learning parameter of the artificial intelligence for learning such that the reproduced image becomes similar to the sample two-dimensional image.

* * * * *